United States Patent
Kawanai

(10) Patent No.: US 11,440,566 B2
(45) Date of Patent: *Sep. 13, 2022

(54) VEHICLE CONTROL SYSTEM

(71) Applicant: TOYOTA JIDOSHA KABUSHIKI KAISHA, Toyota (JP)

(72) Inventor: Taichi Kawanai, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 169 days.

This patent is subject to a terminal disclaimer.

(21) Appl. No.: 17/005,998

(22) Filed: Aug. 28, 2020

(65) Prior Publication Data

US 2021/0061309 A1 Mar. 4, 2021

(30) Foreign Application Priority Data

Aug. 29, 2019 (JP) .............................. JP2019-156950

(51) Int. Cl.
*B60W 60/00* (2020.01)
*B60W 30/09* (2012.01)
(Continued)

(52) U.S. Cl.
CPC ........ *B60W 60/0015* (2020.02); *B60W 30/09* (2013.01); *B60W 30/0956* (2013.01);
(Continued)

(58) Field of Classification Search
CPC .... B60W 10/18; B60W 30/146; B60W 30/16; B60W 30/18163; B60W 50/085;
(Continued)

(56) References Cited

U.S. PATENT DOCUMENTS

| | | | |
|---|---|---|---|
| 6,401,024 B1 * | 6/2002 | Tange ................... | B60W 30/16 180/170 |
| 2009/0012703 A1 * | 1/2009 | Aso ...................... | G05D 1/0214 701/532 |

(Continued)

FOREIGN PATENT DOCUMENTS

| | | |
|---|---|---|
| JP | 2017-194827 A | 10/2017 |
| JP | 2019-96235 A | 6/2019 |
| WO | 2007/102405 A1 | 9/2007 |

*Primary Examiner* — Peter D Nolan
*Assistant Examiner* — Ce Li Li
(74) *Attorney, Agent, or Firm* — Sughrue Mion, PLLC

(57) ABSTRACT

Setting processing of a target acceleration is executed based on a deceleration feature. In the deceleration feature, a relationship between deceleration and a state of a slowdown target of a vehicle is defined. In the deceleration feature, the state is divided into multiple phases by a predetermined boundary deceleration. In the setting processing, at least one deceleration corresponding to the state is specified. Also, a plausibility indicating an accuracy of information on the state or the accuracy of information associated with the state is calculated for each of the at least one deceleration. Further, a minimum value of the at least one deceleration is specified. Based on a phase to which the minimum value belongs in the deceleration feature and a minimum value plausibility indicating a plausibility corresponding to the minimum value, the minimum value is reflected to a target acceleration in a reflection degree of 0 to 100%.

11 Claims, 27 Drawing Sheets

(51) Int. Cl.
*B60W 30/095* (2012.01)
*G08G 1/01* (2006.01)
(52) U.S. Cl.
CPC ....... *B60W 60/0011* (2020.02); *G08G 1/0116* (2013.01); *B60W 2554/20* (2020.02); *B60W 2554/40* (2020.02); *B60W 2554/80* (2020.02); *B60W 2555/60* (2020.02)
(58) Field of Classification Search
CPC ............. B60W 60/00; B60W 60/0011; B60W 60/0015; B60W 2555/60; B60W 2556/20; B60W 2720/106; G08G 1/0116; G08G 1/09623; G08G 1/096725; G08G 1/165
See application file for complete search history.

(56) References Cited

U.S. PATENT DOCUMENTS

| | | | | |
|---|---|---|---|---|
| 2015/0134223 | A1* | 5/2015 | Kim | B60W 30/14 |
| | | | | 701/93 |
| 2017/0129488 | A1* | 5/2017 | Noumura | B60W 10/18 |
| 2017/0308093 | A1 | 10/2017 | Urano et al. | |
| 2017/0327094 | A1* | 11/2017 | Inoue | B60W 30/09 |
| 2021/0061272 | A1* | 3/2021 | Kawanai | B60W 30/18163 |
| 2021/0232157 | A1* | 7/2021 | Dieckmann | G05D 1/0293 |

\* cited by examiner

Case 1: $-a_{M1\_min} = -a(d_i, v_j)$

Case 2: $-a_{M1\_min}$
$= \min\{-a(d_{i-1}, v_{j-1}), -a(d_{i-1}, v_j), -a(d_i, v_{j-1}), -a(d_i, v_j), -a(d_i, v_{j+1}), -a(d_{i+1}, v_{j-1}), -a(d_{i+1}, v_j)\}$

VEHICLE CONTROL SYSTEM

CROSS-REFERENCE TO RELATED APPLICATION

The present application claims priority under 35 U.S.C. § 119 to Japanese Patent Application No. 2019-156950, filed Aug. 29, 2019. The contents of this application are incorporated herein by reference in their entirety.

TECHNICAL FIELD

The present disclosure relates to a control system of a vehicle.

BACKGROUND

JP2017-194827A disclose a system in which automated driving control of a vehicle is executed. The system generates a path of the vehicle based on various types of information. The path of the vehicle is a driving trajectory that defines a collection of target positions at which the vehicle should arrive in the future. Each target position has information on driving state of the vehicle. The driving state includes, for example, velocity and steering angle of the vehicle. In the automated driving control, actuators of the vehicle are controlled such that the driving state is implemented in each of the target positions.

SUMMARY

Suppose the system detects an obstacle on the driving trajectory. Then the system determines a risk to collide to the obstacle. And if it is determined that the risk is high, the system changes the information on the driving state. At least one of a brake actuator and a steering actuator is operated in accordance with the change of the information on the driving state. However, a series of the operation is executed after the system detects the presence of the obstacle based on the various types of the information. That is, the series of the operation is not executed prior to the presence of the obstacle being detected by the system. However, even prior to the detection of the presence of the obstacle, it is desirable to execute some kind of vehicle control inconsideration of driving safety aspect when the presence is suspected. This is because, in a case of manual driving, a driver who has found an object that appears to be obstacle in a travel direction of the vehicle manipulates the vehicle in consideration of a possibility that this object is the obstacle. However, when the system is forced to execute such vehicle control, driving efficiency of the system may be lowered.

One object of the present disclosure is to provide a system capable of executing automated driving control that makes driving safety and driving efficiency compatible even when the information on the state of a target to be considered for changing the driving state of the vehicle is uncertain.

A first aspect is a vehicle control system which is configured to execute automated driving control of a vehicle.

The vehicle control system comprises an acquiring device and a controller.

The acquiring device is configured to acquire driving environment information of the vehicle.

The controller is configured to execute the automated driving control based on the driving environment information.

In the automated driving control, the controller is configured to execute deceleration setting processing in which a target deceleration is set based on a deceleration feature. The deceleration feature defines a relationship between deceleration and a state of a slowdown target of the vehicle, the state including relative speed of the slowdown target and a distance from the slowdown target to the vehicle. In the deceleration feature, the state is divided into multiple phases by a predetermined boundary deceleration.

In the deceleration setting processing, the controller is configured to:

specify, based on the driving environment information and the deceleration feature, at least one deceleration corresponding to the state;

calculate for each of the at least one deceleration a plausibility indicating an accuracy of information on the state or the accuracy of information associated with the state;

specify a minimum value of the at least one deceleration; and reflect the minimum value to the target deceleration with a reflection degree of 0 to 100% based on a minimum value phase indicating a phase to which the minimum value belongs in the deceleration feature and a minimum value plausibility indicating the plausibility corresponding to the minimum value.

A second aspect further has the following features in the first aspect.

The boundary deceleration includes a first deceleration.

The first deceleration corresponds to a maximum deceleration of the vehicle.

In the deceleration setting processing, the controller is configured to set the reflection degree to 100% regardless of the minimum value plausibility when the minimum value phase belongs to a phase located closer to a rapid deceleration side than the first deceleration.

A third aspect further has the following features in the first aspect.

The boundary deceleration includes a second deceleration.

The second deceleration corresponds to a minimum deceleration of the vehicle.

In the deceleration setting processing, the controller is configured to set the reflection degree to 0% regardless of the minimum value plausibility when minimum value phase belongs to a phase located closer to a slow deceleration side than the second deceleration.

A fourth aspect further has the following features in the first aspect.

The boundary deceleration includes a first deceleration, a second deceleration, and a third deceleration.

The first deceleration corresponds to a maximum deceleration of the vehicle.

The second deceleration corresponds to a minimum deceleration of the vehicle.

The third deceleration corresponds to a deceleration between the maximum deceleration and the minimum deceleration.

In the deceleration setting processing, the controller is configured to change the reflection degree according to specified total number of the at least one deceleration when the minimum value phase belongs to a phase located between the first and third deceleration.

The reflection degree is set to 100% when the specified total number is one.

The reflection degree is set to a value between 0 and 100% depending on the minimum value plausibility when the specified total number is two or more.

A fifth aspect further has the following features in the first aspect.

The boundary deceleration includes a first deceleration, a second deceleration and a third deceleration.

The first deceleration corresponds to a maximum deceleration of the vehicle.

The second deceleration corresponds to a minimum deceleration of the vehicle.

The third deceleration corresponds to a deceleration between the maximum deceleration and the minimum deceleration.

In the deceleration setting processing, the controller is configured to change the reflection degree according to a result of comparing the minimum value plausibility with a threshold when the minimum value phase belongs to a phase located between the second and third deceleration.

The reflection degree is set to 100% when the minimum value plausibility is equal to or greater than the threshold.

The reflection degree is set to 0% when the minimum value plausibility is less than the threshold.

A sixth aspect further has the following features in the first aspect.

The slowdown target is a nearest moving or static obstacle of the vehicle on a driving trajectory of the vehicle.

The driving environment information includes a distance from the moving or static obstacle to the vehicle and relative speed of the moving or static obstacle.

The plausibility is the accuracy of the state of the moving or static obstacle.

A seventh aspect further has the following features in the first aspect.

The slowdown target is a nearest traffic signal of the vehicle on a driving trajectory of the vehicle.

The driving environment information includes a distance from the traffic signal to the vehicle and relative speed of the traffic signal.

The plausibility is the accuracy associated with the state of the traffic signal where the traffic signal is red or yellow.

An eighth aspect is a vehicle control system which is configured to execute automated driving control of a vehicle.

The vehicle control system comprises an acquiring device and a controller.

The acquiring device is configured to acquire driving environment information of the vehicle.

The controller is configured to execute the automated driving control based on the driving environment information.

In the automated driving control, the controller is configured to execute deceleration setting processing in which a target deceleration is set based on a deceleration feature. The deceleration feature defines a relationship between deceleration and a state of a slowdown target of the vehicle. In the deceleration feature, the state is divided into multiple phases by a predetermined boundary deceleration.

The slowdown target is a nearest moving body of the vehicle. The moving body locates laterally of a driving trajectory of the vehicle.

The driving environment information includes driving speed of the vehicle and a position of the moving body.

The state is a distance from the moving body to the vehicle, assuming that the moving body moves according to a predetermined speed distribution model to enter the driving trajectory.

In the deceleration setting processing, the controller is configured to:

specify at least one deceleration corresponding to the distance based on the driving speed, the position and deceleration feature;

calculate, for each of the at least one deceleration, probability that the moving body exists at a position on the driving trajectory that is away from the vehicle by the distance until an estimated time that the vehicle travels along the driving trajectory to reach a side of the moving body elapses;

specify a minimum value of the at least one deceleration; and reflect the minimum value to the target deceleration with a reflection degree of 0 to 100% based on a minimum value phase indicating a phase to which the minimum value belongs in the deceleration feature and a minimum probability indicating the probability corresponding to the minimum value.

A ninth aspect has the following features in the eighth aspect.

The driving trajectory includes at least two candidates.

In the deceleration setting processing, the controller is configured to:

specify the minimum value for each of the combination of the estimated time and the at least two candidates;

when at least two minimum values having a same estimated time are specified, an optimal value to be reflected to the target deceleration is selected from the at least two minimum values.

The controller is further configured to execute trajectory setting processing in which a target driving trajectory of the vehicle is set when the optimal value is selected.

In the trajectory setting processing, the controller is configured to set a candidate corresponding to the optimal value to the target driving trajectory of the vehicle in the estimated time.

A tenth aspect is a vehicle control system which is configured to execute automated driving control of a vehicle.

The vehicle control system comprises an acquiring device and a controller.

The acquiring device is configured to acquire driving environment information of the vehicle.

The controller is configured to execute the automated driving control based on the driving environment information.

The controller is configured to execute deceleration setting processing in the automated driving control based on a deceleration feature. The deceleration feature defines a relationship between deceleration and a state of a slowdown target of the vehicle. In the deceleration feature, the state is divided into multiple phases by a predetermined boundary deceleration.

The slowdown target is a nearest potential moving target of the vehicle. The potential moving target is set in a barrier area located laterally of a driving trajectory of the vehicle.

The driving environment information includes driving speed of the vehicle and a position of the barrier area.

The state is a distance from the potential moving body to the vehicle, assuming that the potential moving body moves according to a predetermined speed distribution model to enter the driving trajectory.

In the deceleration setting processing, the controller is configured to:

specify at least one deceleration corresponding to the distance based on the driving speed, the position and deceleration feature;

calculate, for each of the at least one deceleration, probability that the potential moving body exists at a position on the driving trajectory that is away from the vehicle by the distance until an estimated time that the vehicle travels along the driving trajectory to reach a side of the potential moving body elapses;

specify a minimum value of the at least one deceleration; and reflect the minimum value to the target deceleration with a reflection degree of 0 to 100% based on a minimum value phase indicating a phase to which the minimum value belongs in the deceleration feature and a minimum probability indicating the probability corresponding to the minimum value.

An eleventh aspect has the following features in the tenth aspect.

The driving trajectory includes at least two candidates.

In the deceleration setting processing, the controller is configured to:

specify the minimum value for each of the combination of the estimated time and the at least two candidates;

when at least two minimum values having a same estimated time are specified, an optimal value to be reflected to the target deceleration is selected from the at least two minimum values.

The controller is further configured to execute trajectory setting processing in which a target driving trajectory of the vehicle is set when the optimal value is selected.

In the trajectory setting processing, the controller is configured to set a candidate corresponding to the optimal value to the target driving trajectory of the vehicle in the estimated time.

According to the first aspect, the deceleration setting processing is executed. In the deceleration setting processing, the minimum value of the at least one deceleration corresponding to the state of the slowdown target of the vehicle is specified. The fact that the minimum value is specified means that a safest deceleration is specified as the deceleration of the vehicle even when the information on the state of slowdown target is uncertain. Also, in the deceleration setting processing, the minimum value is reflected to the target deceleration with the reflection degree of 0 to 100% based on the minimum value phase and the minimum value plausibility. The minimum value phase is the phase to which the minimum value belongs among the phases of the deceleration feature which are divided into multiple phases by the predetermined boundary deceleration. The minimum value plausibility is the plausibility corresponding to the minimum value and indicating the accuracy of the information on the state of the slowdown target or the accuracy of the information associated with the state. Therefore, according to the deceleration setting processing, even when the information on the state of the slowdown target is uncertain, it is possible to reflect the minimum value which is the safest deceleration flexibly to the target deceleration while considering the minimum value phase and the minimum value plausibility. Therefore, it is possible to execute the automated driving control in which the driving safety and the driving efficiency are compatible with each other.

According to the second aspect, when the minimum value phase belongs to the phase located closer to the rapid deceleration side than the first deceleration, the reflection degree is set to 100% regardless of the minimum value plausibility. In the phase located closer to the rapid deceleration side than the first deceleration, the maximum deceleration is applied. Therefore, according to the second aspect, it is possible to execute automated driving control with emphasis on the driving safety.

According to the third aspect, when the minimum value phase belongs to phase located closer to the slow deceleration side than the second deceleration, the reflection degree is set to 0% regardless of the minimum value plausibility. In the phase located to the slow deceleration side than the second deceleration, the minimum deceleration is applied or no deceleration is performed. Therefore, according to the third aspect, it is possible to execute the automated driving control with emphasis on the driving efficiency.

According to the fourth aspect, when the minimum value phase belongs to the phase located between the first and third deceleration, the reflection degree is changed according to the specified total number of the at least one deceleration. When the specified total number is one, the reflection degree is set to 100%. When there is more than one specified total number, the reflection degree is set to values between 0 and 100%, depending on the minimum value plausibility. Therefore, according to the fourth aspect, it is possible to execute appropriate automated driving control in accordance with current situation.

According to the fifth aspect, when the minimum value phase belongs to the phase located between the second and third deceleration, the reflection degree is changed according to the result of comparing the minimum value plausibility with the threshold. When the minimum value plausibility is equal to or greater than the threshold, the reflection degree is set to 100%. When the minimum value plausibility is less than the threshold, the reflection degree is set to 0%. Therefore, according to the fifth aspect, it is possible to execute the automated driving control while maintaining a balance between the driving safety and the driving efficiency.

According to the sixth aspect, when the nearest moving or static obstacle on the driving trajectory corresponds to the slowdown target, it is possible to execute the automated driving control in which the driving safety and driving efficiency are compatible with each other.

According to the seventh aspect of the present aspect, when the nearest traffic signal on the driving trajectory corresponds to the slowdown target, it is possible to execute the automated driving control in which the driving safety and driving efficiency are compatible with each other.

According to the eighth aspect, deceleration setting processing is executed. In the deceleration setting processing, processing is executed in which the minimum value plausibility of the first aspect is replaced with the minimum probability. The minimum probability is the minimum value of the probabilities calculated by estimating a behavior of the moving body located laterally of the driving trajectory of the vehicle. Therefore, according to the deceleration setting processing, even when the behavior of the moving body is uncertain, it is possible to reflect the minimum value which is the safest deceleration flexibly to the target deceleration while considering the minimum value phase and the minimum probability. Therefore, it is possible to execute the automated driving control in which the driving safety and the driving efficiency are compatible with each other.

According to the tenth aspect, the deceleration setting processing is executed on the at least two candidates. When the at least two minimum values having the same estimated time are specified, the optimal value is selected. When the optimal value is selected, the candidate corresponding to the optimal value is set to the target driving trajectory in the estimated time. Therefore, according to the tenth aspect, it is possible to increase the compatibility between the driving safety and the driving efficiency.

According to the ninth or eleventh aspect, the deceleration setting processing is executed. In the deceleration setting processing, processing is executed in which the minimum value plausibility of the first aspect is replaced with the minimum probability. The minimum probability is the minimum value of the probabilities calculated by estimating the behavior of the potential moving body set in the barrier area located laterally of the driving trajectory of the vehicle. Therefore, according to the deceleration setting processing, it is possible to flexibly reflect the minimum value which is the safest deceleration to the target deceleration. Therefore, it is possible to execute the automated driving control in which the driving safety and the driving efficiency are compatible with each other.

DESCRIPTION OF EMBODIMENTS

Embodiments of the present disclosure are described hereunder with reference to the accompanying drawings. However, it is to be understood that even when the number, quantity, amount, range or other numerical attribute of an element is mentioned in the following description of the embodiments, the present disclosure is not limited to the mentioned numerical attribute unless it is expressly stated or theoretically defined. Further, structures or steps or the like described in conjunction with the following embodiments are not necessarily essential to embodiments of the present disclosure unless expressly stated or theoretically defined.

1. First Embodiment

First, a first embodiment will be described with reference to FIGS. 1 to 11.

1.1 Assumption

Figure 1:
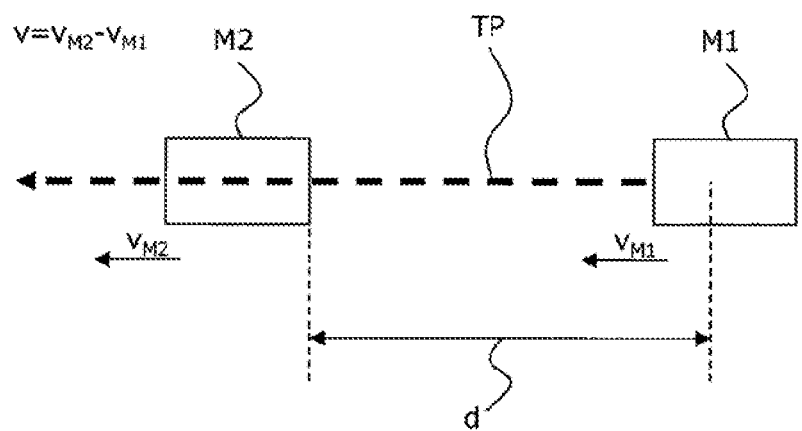
FIG. 1 is a diagram for illustrating a situation where a first embodiment is assumed.

FIG. 1 is a diagram for explaining a situation where the first embodiment is assumed. A vehicle M1 shown in FIG. 1 is a vehicle on which a vehicle control system according to the first embodiment (hereinafter also referred to as a "system" in the first embodiment) is mounted. Examples of the vehicle M1 include a vehicle in which an engine is used as a power source, an electronic vehicle in which a motor is used as the power source, and a hybrid vehicle having the engine and the motor.

The vehicle M1 has a plan to run on a driving trajectory TP at driving speed $v_{M1}$ according to automated driving control executed by the system. The driving trajectory TP defines a collection of target positions that a reference position of the vehicle M1 should reach. The reference position includes a gravity center of the vehicle M1 and a center of rear wheel shaft.

In front of the vehicle M1 by a distance of d, a vehicle M2 runs at driving speed $v_{M2}$. The vehicle M2 is a preceding vehicle which exists on the driving trajectory TP. The vehicle M2 need not be equipped with a system similar to the system installed in the vehicle M1. Relative speed v of the vehicle M2 to the vehicle M1 is represented by $v_{M2}-v_{M1}$. The vehicle M2 may be a moving body that differs from a vehicle or may be a stationary body. If the vehicle M2 is the stationary body, the relative speed v of the stationary body is represented by $-v_{M1}$.

1.1.1 Concept of Deceleration Feature

Figure 2:
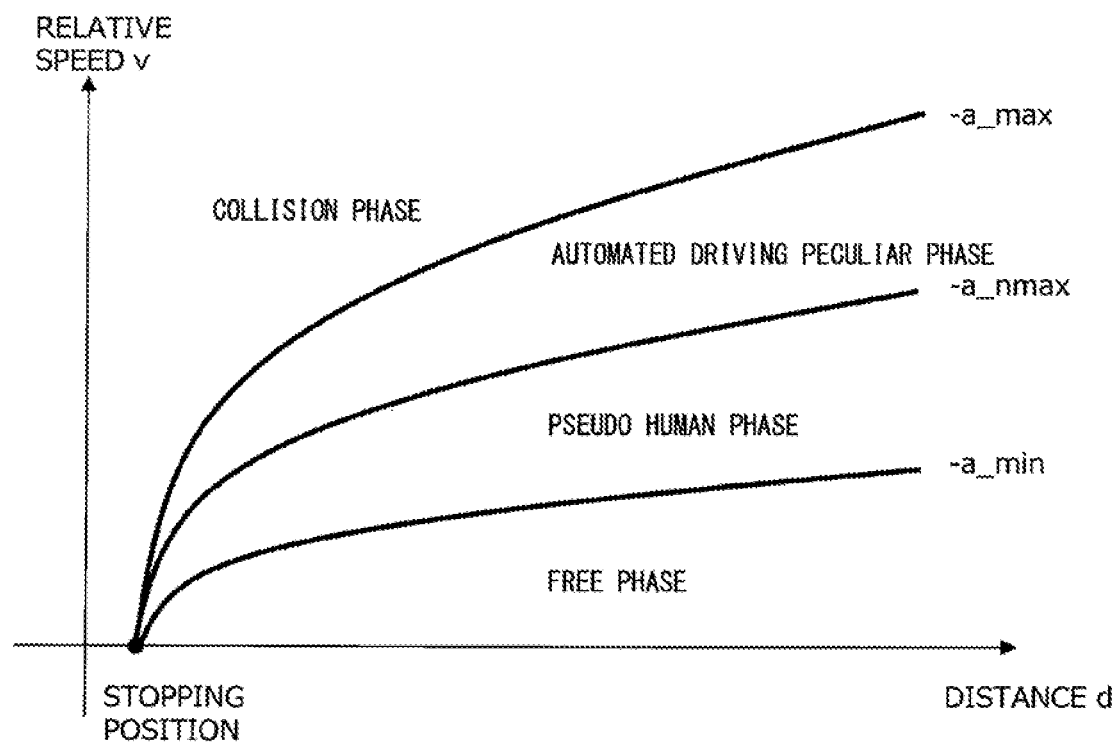
FIG. 2 is a conceptual diagram for showing a relationship between a distance and relative speed during a slowdown of a vehicle.

Under the situation shown in FIG. 1, suppose a case where an object OBJ for which a slowdown of the vehicle M1 should be considered (hereinafter referred to as a "slowdown target") is vehicle M2. In the first embodiment, the slowdown target OBJ corresponds to the nearest moving or static obstacle of the vehicle M1 on the driving trajectory TP. FIG. 2 is a conceptual diagram for showing a relationship between the distance d and the relative speed v during the slowdown of the vehicle M1. In the present disclosure, the relationship shown in FIG. 2 is referred to as a "deceleration feature". For convenience of explanation, in the explanation of FIG. 2, it is assumed that the vehicle M2 is the static obstacle. It is also assumed that the presence of the vehicle M2 has been correctly detected and that the distance d and the relative speed v have been correctly calculated.

Consider a situation where the vehicle M1 running at the driving speed $v_{M1}$ slows down and stops at a position behind the vehicle M2 by a given distance $d_0$. In this case, a process in which the vehicle M1 approaches the vehicle M2 (hereinafter referred to as an "approaching process" in the first embodiment) is represented by three types of quadratic curves depending on deceleration $-a_{M1}$ of the vehicle M1. A quadratic curve shown in atop of FIG. 2 represents the approaching process when the deceleration $-a_{M1}$ is a maximum deceleration $-a\_max$ of the system (hereinafter also referred to a "first deceleration"). The fact that a state of the vehicle M2 exists in a phase between this quadratic curve and the vertical axis has the following meaning. That is, it means that the vehicle M1 cannot stop at the position mentioned above even when the slowdown with the first deceleration is performed after the detection of the vehicle M2. Thus, this phase is defined as a "collision phase".

The quadratic curve shown in a bottom of FIG. 2 represents the approaching process where the deceleration $-a_{M1}$ is a minimum deceleration $-a\_min$ of the system (hereinafter also referred to a "second deceleration"). The fact that the state of the vehicle M2 exists in a phase between this quadratic curve and the horizontal axis has the following meaning. That is, it means that the vehicle M1 stops in front of a stopping position when the slowdown with the second deceleration is performed after the detection of the vehicle M2. It also means that vehicle M1 stops in front of the stopping position even when the slowdown with the second deceleration is not performed. Thus, this phase is defined as a "free phase".

The quadratic curve shown in a middle of FIG. 2 represents the approaching process when the deceleration $--a_{M1}$ is a maximum deceleration $-a\_nmax$ (hereinafter also referred to as a "third deceleration") normally used by a human (a driver). When manual driving is performed, the driver is able to detect the obstacle on a roadway relatively far away. On the other hand, performance of a general automated drive system to detect this obstacle is limited. Therefore, the quadratic curve indicating the approaching process when the slowdown with the third deceleration is performed differs from that with the second deceleration.

Therefore, the fact that when the state of the vehicle M2 is in a phase between the quadratic curve with the second deceleration and that with the third deceleration is performed has the following meaning. That is, it means that when the slowdown of the vehicle M between the second deceleration and the third deceleration is performed after the detection of the vehicle M2, the slowdown similar to the one during the manual driving is performed. Thus, this phase is defined as a "pseudo human phase".

The fact that the state of the vehicle M2 is in a phase between the quadratic curve with the first deceleration and that with the third deceleration has the following meaning. That is, it means that when the slowdown of the vehicle M1 with the deceleration between the first deceleration and the third deceleration is performed after the detection of the vehicle M2, a characteristic slowdown is performed. Thus, this phase is defined as an "automated driving peculiar phase".

In summary, when the vehicle M2 as the slowdown target OBJ exists, the state of the vehicle M2 is classified into the "collision phase", the "free phase", the "pseudo human phase" or the "automated driving peculiar phase".

When the vehicle M2 is the moving obstacle, the relationship between the distance d and the distance relative speed v during the slowdown of the vehicle M1 is explained as follows with the aid of the explanation mentioned above. That is, in this case, each of the first, second and third deceleration lines is moved toward the horizontal axis. Further, the stopping position shown in FIG. 2 moves to an intersection of $d=d_1$ and $v=v_{M2}$. The distance $d_1$ is a proper inter-vehicular distance between the vehicles M1 and M2. The proper inter-vehicular distance may be constant or may be changed in accordance with the driving speed $v_{M1}$.

1.1.2 Problems in Automated Driving Peculiar Phase

As mentioned in the explanation of FIG. 2, the performance of the general automated drive system to detect the obstacle on the road is limited. This also applies to the performance of the system for detecting the vehicle M2. Therefore, the combinations of the distance d and the relative speed v when the vehicle M2 is not detected by the system at all should be represented in the deceleration feature shown in FIG. 2. In addition the combinations when the vehicle M2 is completely detected by the system should also be represented.

Figure 3:
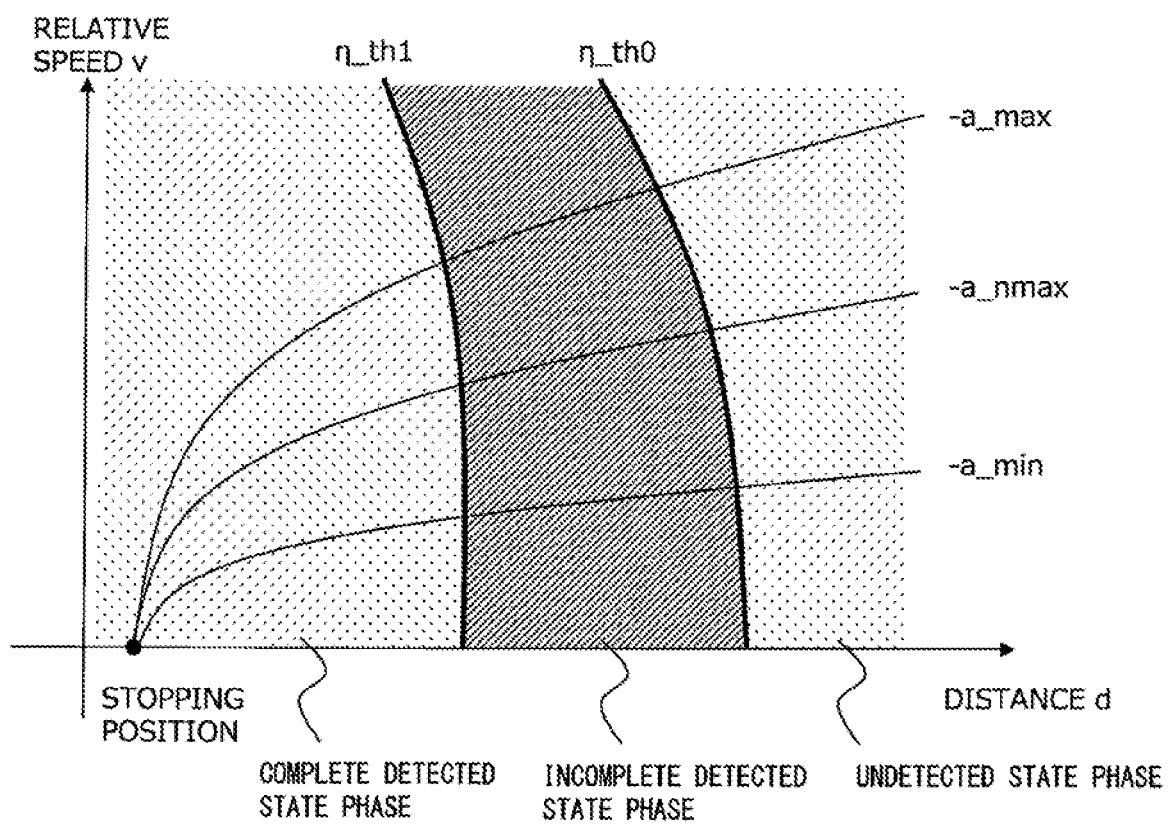
FIG. 3 is a diagram for showing the relationship between the distance and the relative speed during the slowdown of the vehicle and an accuracy of detection of a preceding vehicle by the system.

FIG. 3 is a diagram for showing a relationship between the distance d and the relative speed v during the slowdown of the vehicle M1 and an accuracy of the detection of the vehicle M2 by the system. For convenience of explanation, it is also assumed in FIG. 3 that the vehicle M2 is the static obstacle. In FIG. 3, in addition to the three types of the quadratic curves described in FIG. 2, two types of curves are drawn along the longitudinal axis. The curve drawn on the right is a series of coordinates (d, v) in which a plausibility η indicating the accuracy of the detection of the vehicle M2 matches a threshold η_th0. The threshold η_th0 corresponds to the plausibility η when the vehicle M2 is not detected by the system at all. Therefore, the phase located on the right of the curve of the threshold η_th0 is defined as an "undetected state phase".

On the other hand, the curve drawn on the left side of FIG. 3 are obtained by connecting the coordinates (d, v) in which the accuracy of the detection of the vehicle M2 coincides with a threshold η_th1. The threshold η_th1 corresponds to the plausibility η when the vehicle M2 is completely detected by the system. The threshold η_th1 satisfies η_th1>η_th0. Therefore, the phase located on the left of the curve of the threshold η_th1 is defined as a "complete detected state phase".

When such the "undetected state phase" and the "complete detected state phase" are defined, an intermediate phase of the two is defined as an "incomplete detected state phase". When the state of the vehicle M2 is in the "incomplete detected state phase", the plausibility η of the coordinate (d, v) corresponding to this state is greater than the threshold $\eta\_th0$ and less than the threshold $\eta\_th1$. In the following explanation of first embodiment, among the coordinates (d, v) corresponding to the state of the vehicle M2, the coordinates (d, v) having the plausibility $\eta$ greater than the threshold $\eta\_th0$ is referred to as a "coordinate (d, v|$\eta$)".

What is problematic here is that the plausibility $\eta$ of the coordinate (d, v|$\eta$) is not high in the "incomplete detected state phase". The fact that the plausibility $\eta$ is not high means that the detection of the state of the vehicle M2 is uncertain. If the detection of the state of the vehicle M2 is uncertain, it is difficult not only to determine the state of the vehicle M2, but also to determine the presence of the vehicle M2.

A further concern is that more than one coordinate (d, v|$\eta$) is present in the "incomplete detected state phase" at the same time. In the "complete detected state phase", a single coordinate (d, v|$\eta$) with a high plausibility $\eta$ is specified. On the other hand, in the "incomplete detected state phase", two or more coordinates (d, v|$\eta$) having a low plausibility $\eta$ exist at the same time. It is then difficult to determine which of these coordinates (d, v|$\eta$) corresponds to true state.

As described above, the vehicle M1 is scheduled to run on the driving trajectory 1 according to the execution of the automated driving control. Therefore, the execution of the present control may be continued until the single coordinate (d, v|$\eta$) is specified. However, if the single coordinate (d, v|$\eta$) is specified and it is found that the state of the vehicle M2 is in the "automated driving peculiar phase" shown in FIG. 2, the following problem arise. That is, in this instance, since the slowdown with the deceleration between the first deceleration and the third deceleration is performed, an occupant may be anxious about running behavior of the vehicle M1.

As mentioned above, the plausibility $\eta$ of the coordinate (d, v|$\eta$) is particularly problematic in the phase where the "automated driving peculiar phase" overlaps with the "incomplete detected state phase". The occurrence of the problem is unavoidable as long as the "incomplete detected state phase" is defined. However, in a phase where the "pseudo human phase" and the "incomplete detected state phase" overlap, it does not lead to such a large problem. This is because when the single coordinate (d, v|$\eta$) is specified and the state of the vehicle M2 is found to be in the "pseudo human phase", the slowdown with the deceleration slower than that with the third deceleration is performed. When such a slow deceleration in performed, the occupant is hardly anxious about the driving behavior of the vehicle M1.

1.2 Characteristic of First Embodiment

In view of the problems mentioned above, the first embodiment determines a driving policy of the vehicle M1 when at least one coordinate (d, v|$\eta$) is found to be present. In addition, the first embodiment reflects the determined driving policy to a driving plan. Hereinafter, these characteristics will be described.

1.2.1 Determination of Driving Policy

The determination of the driving policy is performed based on the at least one coordinate (d, v|$\eta$). The reason for expressing the "at least one coordinate (d, v|$\eta$)" is that two cases are assumed: the former is that only one coordinate (d, v|$\eta$) exists and the latter is that two or more coordinates (d, v|$\eta$) exist.

In the former case, the driving policy is determined based on the phase to which the single coordinate (d, v|$\eta$) belongs. In the latter case, a minimum value of the deceleration $-a_{M1}$ corresponding to the two or more coordinates (d, v|$\eta$) (hereinafter referred to as a "minimum value $-a_{M1}\_min$") is specified. The minimum value $-a_{M1}\_min$ corresponds to a safest deceleration of the deceleration $-a_{M1}$ expected in the deceleration feature. The driving policy is determined based on the phase to which the coordinate (d, v|$\eta$) having such the minimum value $-a_{M1}\_min$ belongs.

When there is only one coordinate (d, v|$\eta$), the deceleration $-a_{M1}$ corresponding to the coordinate (d, v|$\eta$) can be regarded as a substantial minimum value $-a_{M1}\_min$. Therefore, in the following explanation of the first embodiment, regardless of the total number of coordinates (d, v|$\eta$), the coordinate (d, v|$\eta$) having the minimum value $-a_{M1}\_min$ is referred to as a "coordinate (d, v|$\eta$|$-a_{M1}\_min$)".

Figure 4:
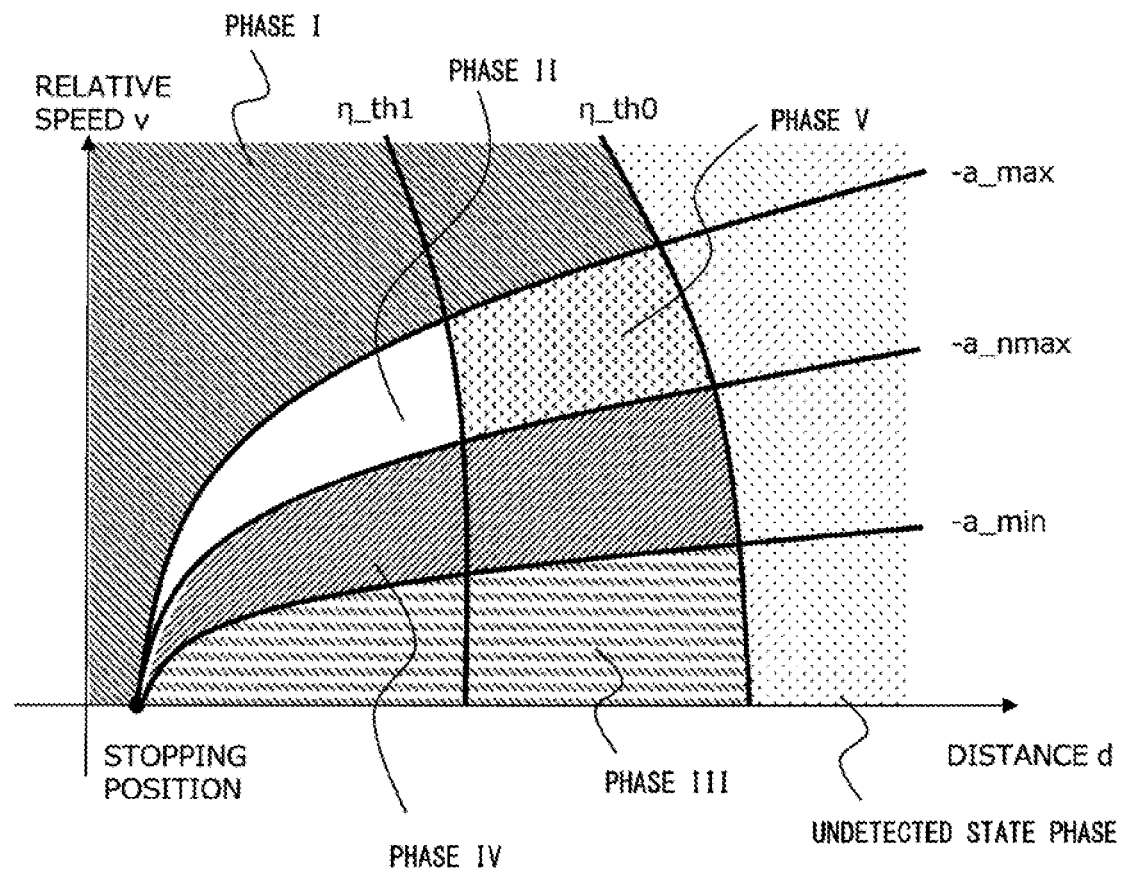
FIG. 4 is an exemplary classification of phases showing the relationship between the distance and the relative speed during the slowdown of the vehicle.

A detailed description of a deceleration $-a_{M1}$ corresponding to the coordinate (d, v|$\eta$) is given in the explanation of a deceleration map in section "1.3.1". Now, specific example of the phase to which the coordinate (d, v|$\eta$|$-a_{M1}\_min$) belongs (hereinafter referred to as a "minimum value phase") and that of the driving policy will be described with reference to FIG. 4. FIG. 4 is an exemplary classification of the phases showing the relationship between the distance d and the relative speed v during the slowdown of the vehicle M1. In FIG. 4, the boundary of the phase described with reference to FIGS. 2 and 3 are drawn. In FIG. 4, a part on the left side (i.e., a part closer to the vertical axis) of the border (i.e., the threshold $\eta\_th0$) that separates the "undetected state phase" and the "incomplete detected state phase" described with reference to FIG. 3 is divided into phases I to V.

The phase 1 is a part on the left side of threshold $\eta\_th0$ in the "collision phase" described with reference to FIG. 2. When the coordinate (d, v|$\eta$|$-a_{M1}\_min$) exists in the phase 1, the driving policy is determined to "slowdown the vehicle M1 immediately with the minimum value $-a_{M1}\_min$". The reason for this is to avoid a collision with the vehicle M2. In this case, an "attempt to steer the vehicle M1 to avoid the collision with the vehicle M2" may be added to the driving policy.

The phase II is a part of left side of threshold $\eta\_th1$ in the "automated driving peculiar phase" described with reference to FIG. 2. If the coordinate (d, v|$\eta$|$-a_{M1}\_min$) exists in the phase II, the driving policy is determined to "slowdown the vehicle M1 immediately with the minimum value $-a_{M1}\_min$". The reason for this is the same as that described in the driving policy in the phase I. Thus, if the coordinate (d, v|$\eta$|$-a_{M1}\_min$) exists in the phase I or II, the driving policy is selected to prioritize the driving safety than the driving efficiency.

The phase III is a part on the left side of the threshold $\eta\_th0$ in the "free phase" described with reference to FIG. 2. If the coordinate (d, v|$\eta$|$-a_{M1}\_min$) exists in the phase III, the driving policy is determined to "maintain current acceleration or deceleration". This is because the collision with the vehicle M2 can be easily avoided without performing the slowdown of the vehicle M1. Thus, if the coordinate (d, v|$\eta$|$-a_{M1}\_min$) exists in the phase III, the driving policy is selected to prioritize the driving efficiency than the driving safety. In this case, "speedup of the vehicle M1 such that the driving speed $v_{M1}$ does not exceed an upper limit" may be applied as the driving policy.

The phase IV is a part on the left side of the threshold $\eta\_th0$ in the "pseudo human phase" described with reference to FIG. 2. If the coordinate (d, v|$\eta$|$-a_{M1}\_min$) exists in the phase IV, the driving policy is determined to postpone a start of the slowdown until the plausibility η of the coordinate (d, v|η|−$a_{M1}$_min) is equal to or greater than a threshold η_th2. This is because there is a possibility that the collision with the vehicle M2 can be avoided even when the slowdown of the vehicle M1 is not performed immediately. Thus, if the coordinate (d, v|η|−$a_{M1}$_min) exists in the phase IV, the driving policy is selected to perform appropriate travel in accordance with the current situation. The threshold η_th 2 corresponds to the plausibility η when a certain accuracy is recognized in the detection of the vehicle M2. The threshold η_th2 satisfies η_th0<η_th2<η_th1.

The phase V is a part between thresholds η_th0 and η_th1 in the "automated driving peculiar phase" described with reference to FIG. 2. If the coordinate (d, v|η|−$a_{M1}$_min) exists in the phase V, the driving policy is determined to "slowdown by changing the minimum value −$a_{M1}$_min according to the plausibility η of the coordinate (d, v|η|−$a_{M1}$_min). The reason for this is that if the coordinate (d, v|η|−$a_{M1}$_min) exists in the phase V, the detection of the state of the vehicle M2 is uncertain. Thus, if the coordinate (d, v|η|−$a_{M1}$_min) exists in the phase V, the driving policy is selected to balance the driving safety and the driving efficiency.

1.2.2 Reflection of Driving Policy

The reflection of the driving policy is performed in the driving plan. The driving plan is planned for each preset time elapsed while the automated driving control is executed. The driving plan includes a driving trajectory TP. The target positions that constitutes the driving trajectory TP have the information on the driving state (i.e., a target acceleration $a_{M1}$_tgt and target steering angle $θ_{M1}$_tgt of the vehicle M1). When the driving policy is determined, the information on the driving state is updated according to contents of the driving policy.

Focusing on the minimum value phase, the driving policy described with reference to FIG. 4 is summarized as follows.

The phase I or II: immediately perform slowdown of the vehicle M1 with the minimum value −$a_{M1}$_min The phase II: maintain the current acceleration or deceleration The phase IV: postpone the start of the slowdown until the plausibility η of the coordinate (d, v|η|−$a_{M1}$_min) becomes equal to or greater than the threshold η_th2

The phase V: perform slowdown by changing the minimum value −$a_{M1}$_min according to the plausibility η of the coordinate (d, v|η|−$a_{M1}$_min)

According to the driving policy in the phase I or II, the minimum value −$a_{M1}$_min is immediately reflected in the target acceleration $a_{M1}$_tgt. On the other hand, according to the driving policy in the phase III, the minimum value −$a_{M1}$_min is not reflected to the target acceleration $a_{M1}$_tgt at all. Here, an attention will be paid to a reflection degree toward the target acceleration $a_{M1}$ tgt. Then, the reflection degree according to the driving policy in the phase I or II is 100% whereas that in the phase III is 0%.

Figure 5:
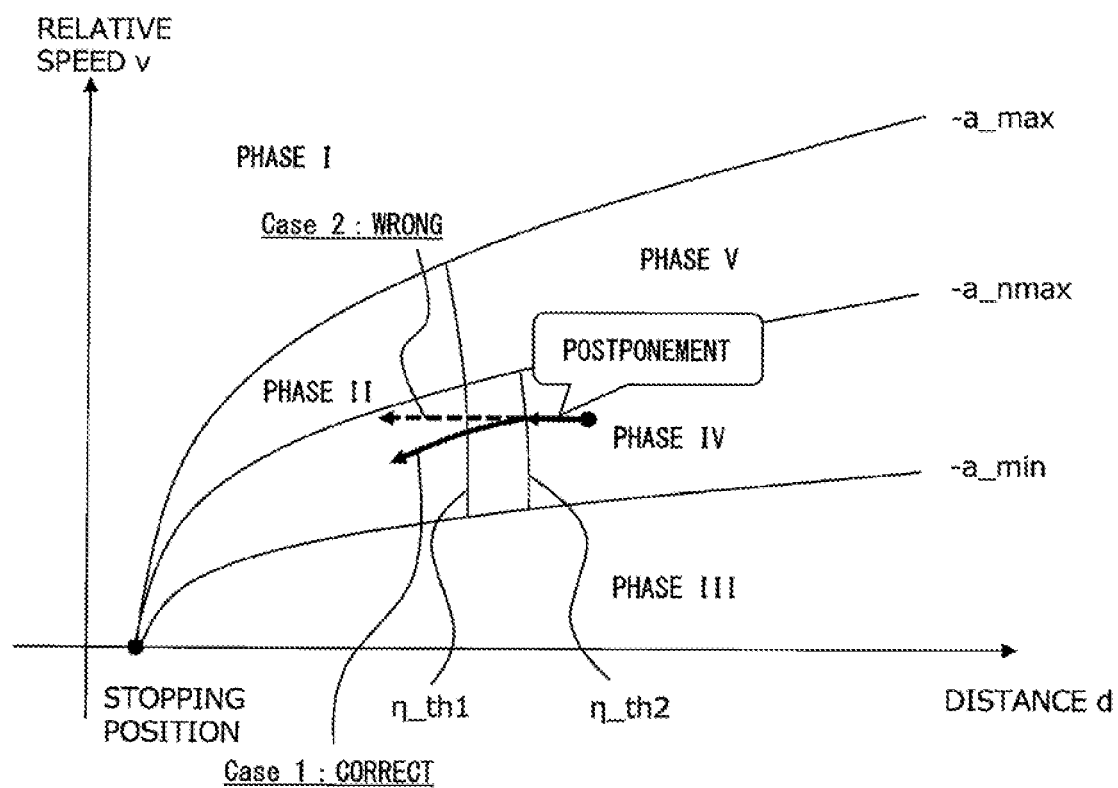
FIG. 5 is a diagram for explaining a reflection method of a driving policy in the phase IV shown in FIG. 4.

According to the driving policy in the phase IV, the reflection degree is changed in accordance with a result of comparing with threshold η_th2. FIG. 5 is a diagram for explaining a reflection method of the driving policy in the phase IV shown in FIG. 4. In Figure S, the phases I to V described in FIG. 4 are drawn. However, for convenience of explanation, the curve of the threshold η_th0 is omitted. In addition, a part of the curves of the thresholds η_th1 and η_th2 is omitted. The black circle shown in the phase IV of FIG. 5 represents the coordinate (d, v|η|−$a_{M1}$_min). In the example shown in FIG. 5, it is assumed that, during the approaching process, the plausibility η of the coordinate (d, v|η|−$a_{M1}$_min) rises to a value equal to or greater than the threshold η_th2.

According to the driving policy in the phase IV, if the plausibility η of the coordinate (d, v|η|−$a_{M1}$_min) is less than the threshold η_th2, the minimum value −$a_{M1}$_min is not reflected in the target acceleration $a_{M1}$_tgt. If the plausibility η of the coordinate (d, v|η|−$a_{M1}$_min) is equal to or greater than the threshold η_th2, the minimum value −$a_{M1}$_min is reflected in the target acceleration $a_{M1}$_tgt. As described above, according to the driving policy in the phase IV, the reflection degree is switched between 0% and 100%.

In FIG. 5, two types of trajectories are drawn on the left of the threshold η_th2. The trajectory shown in the solid line (i.e., Case 1) represents the approaching process where the detection of the vehicle M2 was correct. The trajectory shown in the broken line (i.e., Case 2) represents the approaching process where this detection was really wrong. Note that the broken line trajectory is a trajectory shown for convenience. This is because, in the case of the false detection, the coordinate (d, v|η|−$a_{M1}$_min) does not exist on the deceleration feature during the approaching process.

Figure 6:
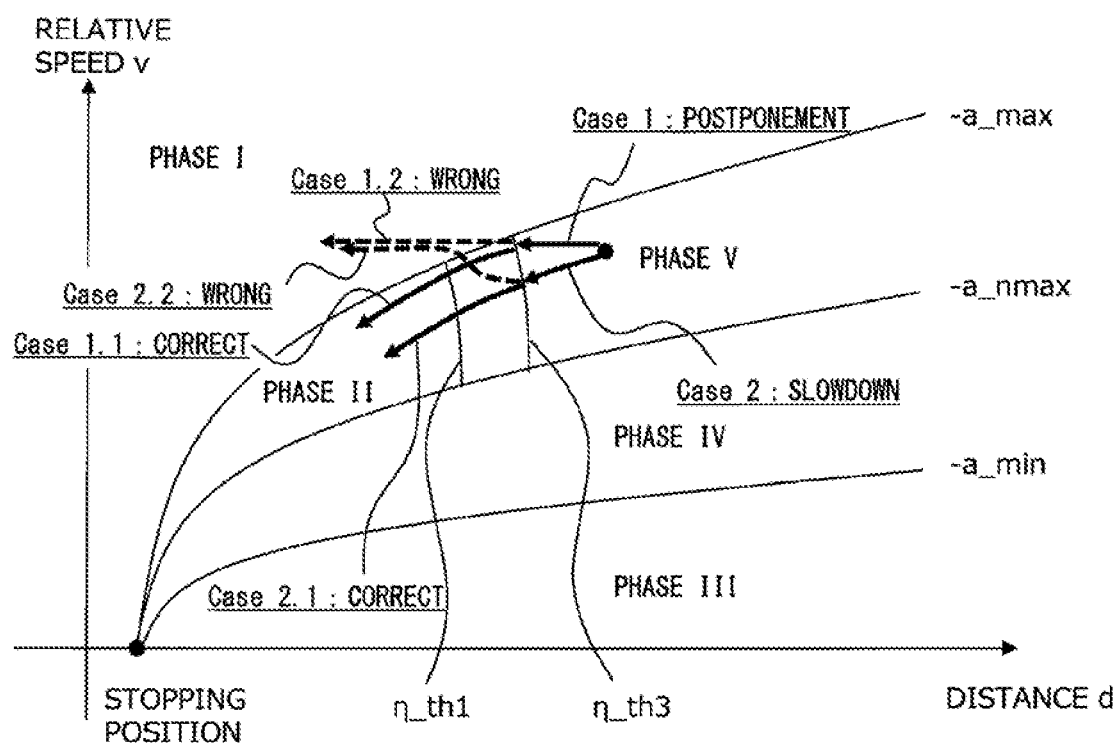
FIG. 6 is a diagram for explaining the reflection method of the driving policy in the phase V shown in FIG. 4.
Figure 7:
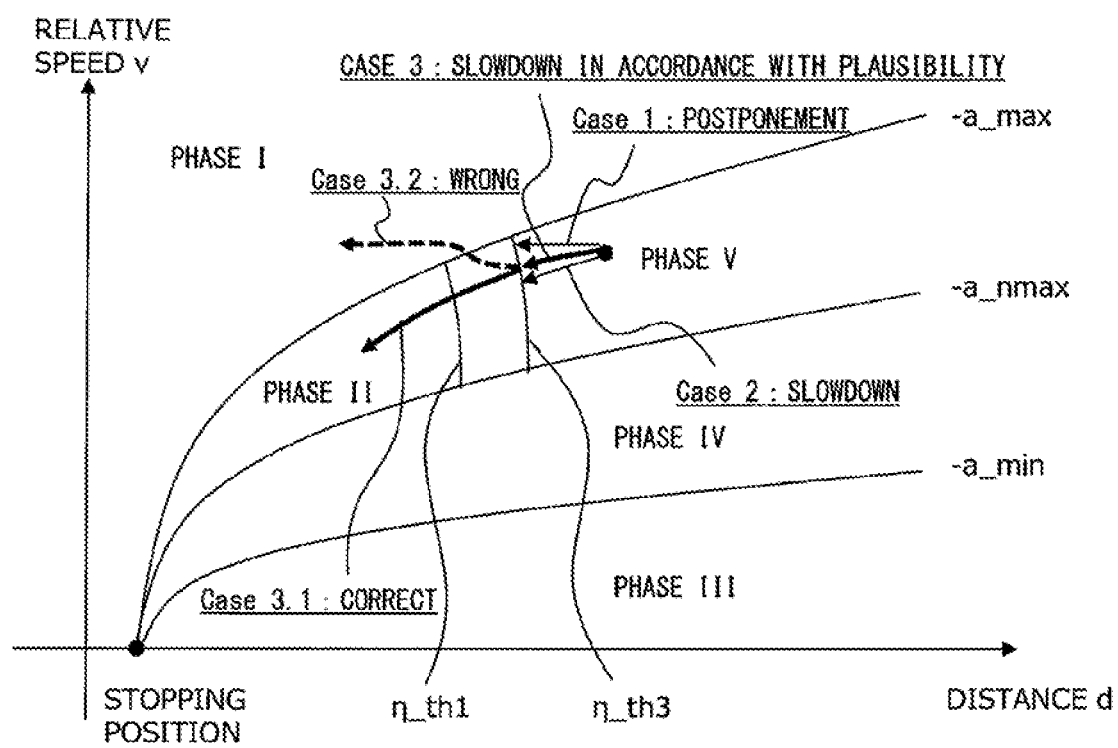
FIG. 7 is a diagram for explaining the reflection method of the driving policy in the phase V shown in FIG. 4.

According to the driving policy in the phase V, the reflection degree is changed in accordance with the plausibility η of the coordinate (d, v|η|−$a_{M1}$_min). FIGS. 6 and 7 are diagrams for explaining the reflection method of the driving policy in the phase V. The curves shown in these figures are basically the same as those shown in FIG. 5. However, in FIGS. 6 and 7, the curve of the threshold η_th3 is drawn instead of the curve of the threshold η_th2. The definition of the threshold η_th3 is the same as that of the threshold η_th2. The threshold η_th3 may be the same value as the threshold η_th2 or may be different value from the threshold η_th2. The black circles shown in the phase V of FIGS. 6 and 7 represent the coordinate (d, v|η|−$a_{M1}$_min). In the examples shown in FIGS. 6 and 7, it is assumed that, during the approaching process, that plausibility η of these coordinate is increased to a value equal to or greater than the threshold η_th3.

In FIG. 6, two types of trajectories are drawn on the right of the threshold η_th3. The first trajectory (i.e., Case 1) represents the approaching process in which the start of the slowdown is postponed. The second trajectory (i.e., Case 2) represents the approaching process in which the slowdown is performed immediately. In FIG. 6, four types of trajectories are drawn on the left of the threshold η_th3. The trajectories shown in the solid line (i.e., Cases 1.1 and 2.1) represent the approaching process where the detection of the vehicle M2 was correct. The trajectories shown in the broken line (Cases 1.2 and 2.2) represent the approaching process where the detection was really wrong. The fact that broken line trajectory is a trajectory for convenience is as explained in FIG. 5.

The case 1.2 corresponds to a case where the postponement performed in the case 1 did not result in a problem. The result in the case 1.2 is also applied to the case 2.1. However, in the case 1.1, since the postponement has been performed, the minimum value −$a_{M1}$_min becomes smaller after the start of the slowdown (i.e., rapid deceleration is performed). In the case 2.2, a speedup is performed immediately after the start of the slowdown. Therefore, in the cases 1.1 and 2.2, the occupant may anxious about the running behavior of the vehicle M1.

In this regard, according to the driving policy in the phase V, the minimum value −$_{M1}$_min is changed according to the plausibility η of the coordinate (d, v|η|−$a_{M1}$_min). In FIG. 7, three types of trajectories are drawn on the right of the threshold η_th3. The first and second trajectories (i.e., Cases 1 and 2) are the same as those shown in FIG. 6. The third trajectory (i.e., Case 3) represents the approaching process in which the slowdown is performed with the minimum value −$a_{M1}$_min obtained by multiplying a coefficient α (0<α<1). The coefficient α is designed to approach 1 as the plausibility η of this coordinate increases. As described above, the reflection degree of the driving policy in the phase V is expressed as 100·α %, thereby a slow deceleration is performed.

In FIG. 7, two types of the trajectories are additionally drawn on the left of the threshold η_th3. The trajectory shown in the solid line (i.e., Case 3.1) represents the approaching process where the detection of the vehicle M2 was correct. The trajectory shown in the broken line (i.e., Case 3.2) represents the approaching process where the detection was really wrong. Unlike the cases 1.1 and 2.2 described with reference to FIG. 6, beginnings of the trajectories in the cases 3.1 and 3.2 lead to an end of the trajectory in the case 3. Therefore, when comparing the cases 1 to 3, feeling of strangeness on the running behavior of the vehicle M1 is suppressed in the case 3.

1.2.3 Effect

According to the characteristics of the first embodiment, the driving policy is determined when the presence of the at least one coordinate (d, v|η|) is found. Therefore, even when the plausibility η of the coordinate (d, v|η|−$a_{M1}$_min) is low, the driving policy based on the minimum value −$a_{M1}$_min, which is the safest deceleration assumed on the deceleration feature. Further, according to the characteristics of the first embodiment, the minimum value −$a_{M1}$_min is reflected to the target acceleration $a_{M1}$_tgt with the reflection degree of 0 to 100% based on the plausibility η and the minimum value phase of the coordinate (d, v|η|−$a_{M1}$_min). Therefore, even when the detection of the state of the vehicle M2 is uncertain, it is possible to execute the automated driving control in which the driving safety and the driving efficiency are compatible with each other.

1.3 Vehicle Control System

Next, a configuration example of the system in which the automated driving control including the characteristic processing is executed will be described.

1.3.1 System Configuration Example

Figure 8:
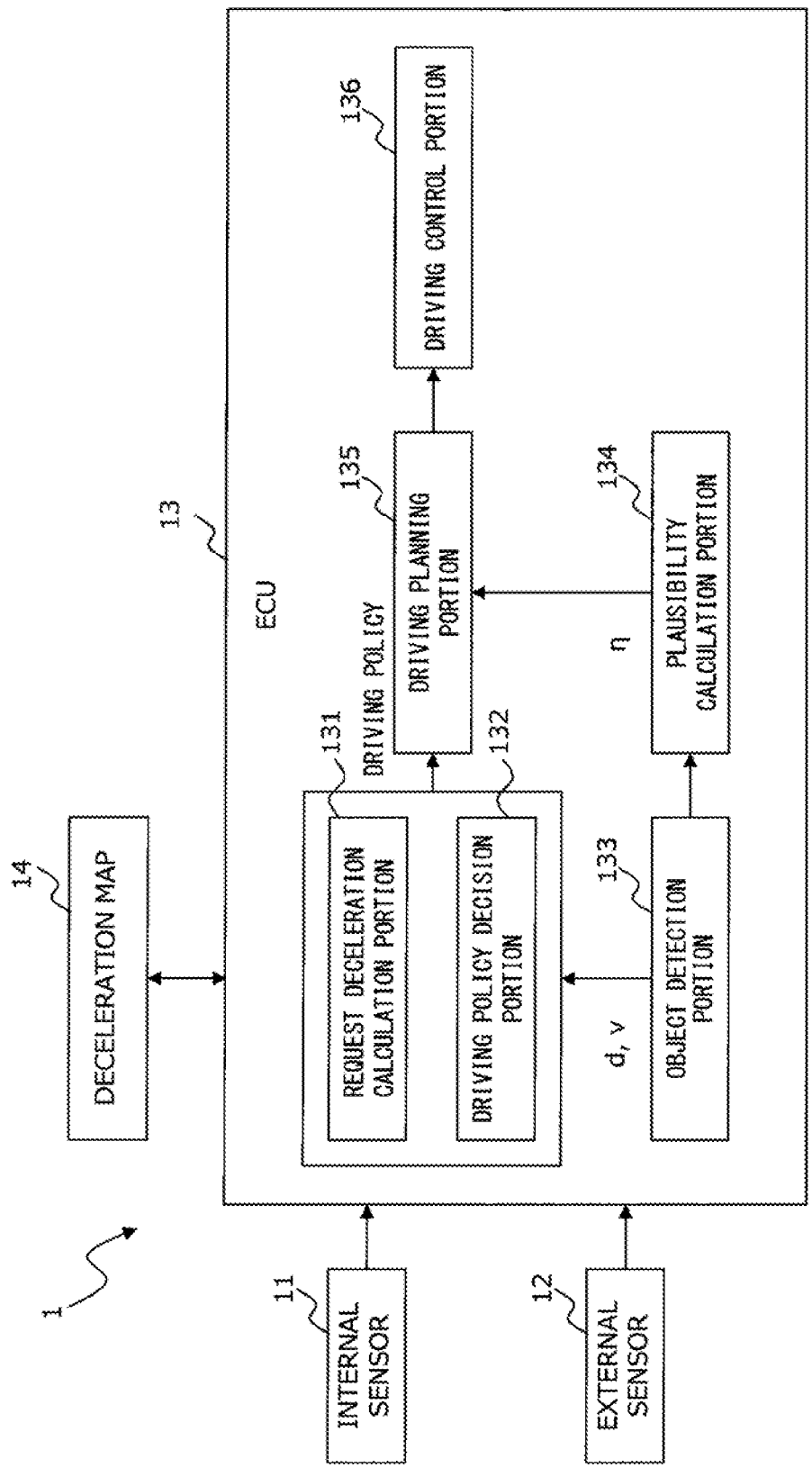
FIG. 8 is a block diagram for showing a configuration example of a system according to a first embodiment.

FIG. 8 is a block diagram fro showing a configuration example of the system 1 according to the first embodiment. As shown in FIG. 8, the system 1 includes an internal sensor 11, an external sensor 12, an ECU (Electric Control Unit) 13 as a controller, and a deceleration map 14.

The internal sensor 11 is a device that detects a driving state of the vehicle M1. The internal sensor 11 includes a vehicle speed sensor, an acceleration sensor and a yaw rate sensor. The vehicle speed sensor detects driving speed $v_{M1}$. The acceleration sensor detects acceleration am of the vehicle M1. The yaw rate sensor detects yaw rate around a vertical axis of a center of gravity of the vehicle M1. The internal sensor 11 transmits the detected data to the ECU 13.

The external sensor 12 is a device that detects condition around the vehicle M1. The external sensor 12 includes a radar sensor and a camera. The radar sensors use radio waves (e.g., millimeter wave) or lights to detect an object around the vehicle M1. The object include the static object and the moving body. The static object includes a guard rail and a building. The moving body includes a walker, a bicycle, a motorcycle, and a vehicle other than the vehicle M1. The camera images situation outside the vehicle M1. The camera is mounted, for example, on a back side of a windshield. The external sensor 12 transmits the detected data to the ECU 13.

The information on the driving state of the vehicle M1 and the information on the situation around the vehicle M1 are included in the driving environment information of the vehicle M1. That is, the internal sensor 11 and the external sensor 12 are included in the "acquiring device to acquire the driving environment information".

The ECU 13 is a microcomputer that includes a processor, a memory, and an input interface and an output interface. The ECU 13 receives a variety of information via the input interface. The ECU 13 also executes automated driving control processing based on the received information. The ECU 13 includes a configuration to execute the automated driving control processing. Details of this configuration will be described in the section "1.3.2".

The deceleration map 14 is a cell map in which the relationship between the state of the slowdown target OBJ (i.e., the distance d and the relative speed v) and the deceleration −$a_{M1}$ is defined. The deceleration map 14 is stored in a database that is able to communicate with the ECU 13. The database may be formed in a computer of a facility (e.g., a management center) capable of communicating with the vehicle M1. The deceleration map 14 is set, for example, for each velocity range having a predetermined width. Which deceleration map is used is determined based on a velocity range to which the driving speed $v_{M1}$ belongs.

Figure 9:
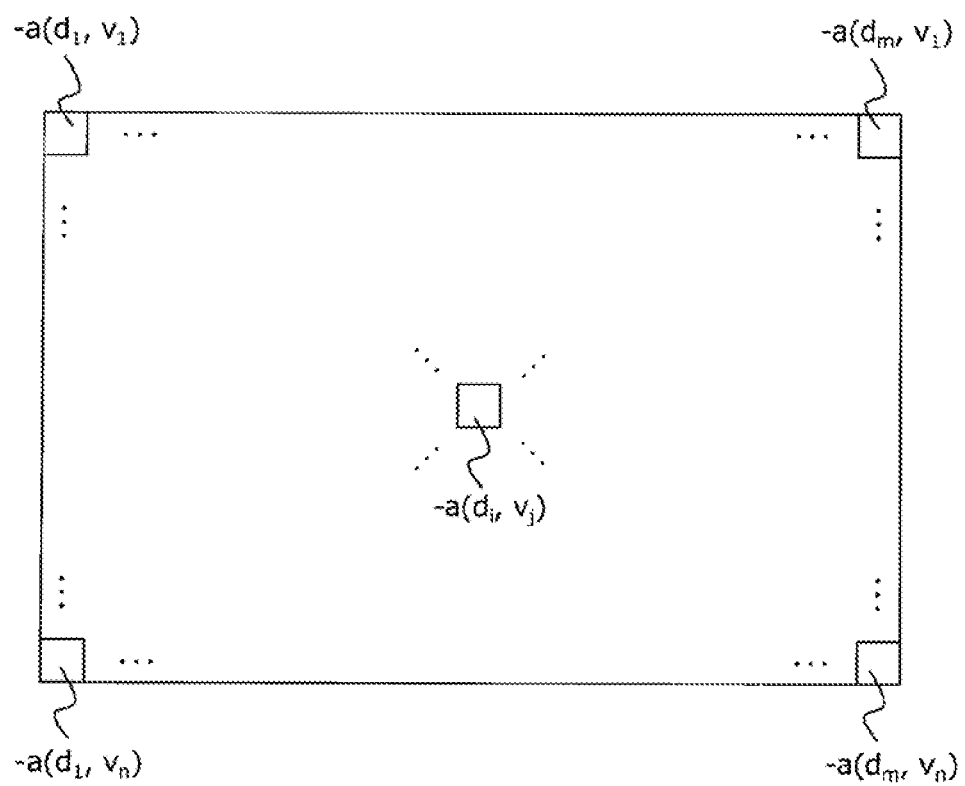
FIG. 9 is a diagram for illustrating an example of a deceleration map.

FIG. 9 is a diagram for illustrating an example of the deceleration map 14. As shown in FIG. 9, each of cells ($d_i$, $v_j$) in the deceleration map 14 has the deceleration −$a_{M1}$. Here, "i" is a natural number that satisfies 1≤i≤n, "j" is the natural number that satisfies 1≤j≤m, and "n" and "m" are natural numbers of 2 or more. The deceleration −$a_{M1}$ assigned to each cell ($d_i$, $v_j$) matches the deceleration −$a_{M1}$ which was assigned to each coordinates ($d_i$, $v_j$) in the deceleration feature described in FIG. 4. Some of the cells ($d_i$, $v_j$) may be further subdivided. In this case, the deceleration −$a_{M1}$ is given to each of the segmented cells.

The deceleration −$a_{M1}$ which is assigned to each cell ($d_i$, $v_j$) may not be different values from each other. For example, the deceleration −a ($d_i$, $v_j$) assigned to the cell ($d_i$, $v_j$) and the deceleration −a ($d_{i+1}$, $v_j$) assigned to the cell ($d_{i+1}$, $v_j$) may be the same. The deceleration −a ($d_i$, $v_j$) and the deceleration −a ($d_{i+1}$, $v_{j+1}$) assigned to the cell ($d_{i+1}$, $v_{j+1}$) may be the same. The deceleration −a ($d_i$, $v_j$) and the deceleration −a ($d_{i+2}$, $v_{j+1}$) assigned to the cell ($d_{i+2}$, $v_{j+1}$) may be the same.

In the deceleration map 14, the first, second and third deceleration (i.e., the deceleration −a_max, −$a_{M1}$_min and −a_nmax) are connected to the cells ($d_i$, $v_j$) whose deceleration −$a_{M1}$ are equal. Then, the cells ($d_i$, $v_j$) in the deceleration map 14 are allocated to one of four segmented area which are bounded by these deceleration. Hereinafter, the first, second and third deceleration are collectively referred to as a "boundary deceleration".

1.3.2 Configuration Example of ECU

As shown in FIG. 8, the ECU 13 includes a request deceleration calculation portion 131, a driving policy decision portion 132, an object detection portion 133, a plausibility calculation portion 134, a driving planning portion 135, and a driving control portion 136. These function blocks are realized when the processor of the ECU 13 executes various control programs stored in the memory. Hereinafter, for convenience of explanation, the request deceleration calculation portion 131, the driving policy decision portion 132 and the like are abbreviated as the "calculation portion 131", the "decision portion 132" and the like.

The calculation portion 131 calculates a request value of the deceleration $-a_{M1}$. The request value is calculated by referring to the deceleration map 14. The deceleration map 14 is referenced by using the information on the state of the slowdown target OBJ. The request value corresponds to all of the deceleration $-a_{M1}$ that correspond to the cell $(d_i, v_j)$ corresponding to this information. In other words, if there is only one cell $(d_i, v_j)$ that corresponds to the information, only the deceleration $-a (d_i, v_j)$ corresponds to the request value. When there are two or more cells $(d_i, v_j)$ that correspond to the information, each of the deceleration $-a_{M1}$ corresponding to the cells corresponds to the request value. The calculation portion 131 transmits the request value to the decision portion 132.

The decision portion 132 determines the driving policy. The decision portion 132 first specify the minimum value $-a_{M1}\_\min$ based on the request value transmitted from the calculation portion 131. If only one request value exists, this request value is the minimum value $-a_{M1}\_\min$. If more than one request value exists, the request value with the lowest deceleration $-a_{M1}$ is the minimum value $-a_{M1}\_\min$. The decision portion 132 then determines any of (i) to (iv) below as the driving policy based on a segmented area to which a cell having the minimum value $-a_{M1}\_\min$ (referred to as a "minimum value cell" in the following description of the first embodiment) belongs and transmits it to the planning portion 135.

(i) Perform the slowdown the vehicle M1 immediately with the minimum value $-a_{M1}\_\min$ (ii) Maintain the current acceleration or deceleration (iii) Postpone the start of the slowdown until the plausibility $\eta$ of the minimum value cell becomes equal to or greater than the threshold $\eta\_th2$.

Figure 10:
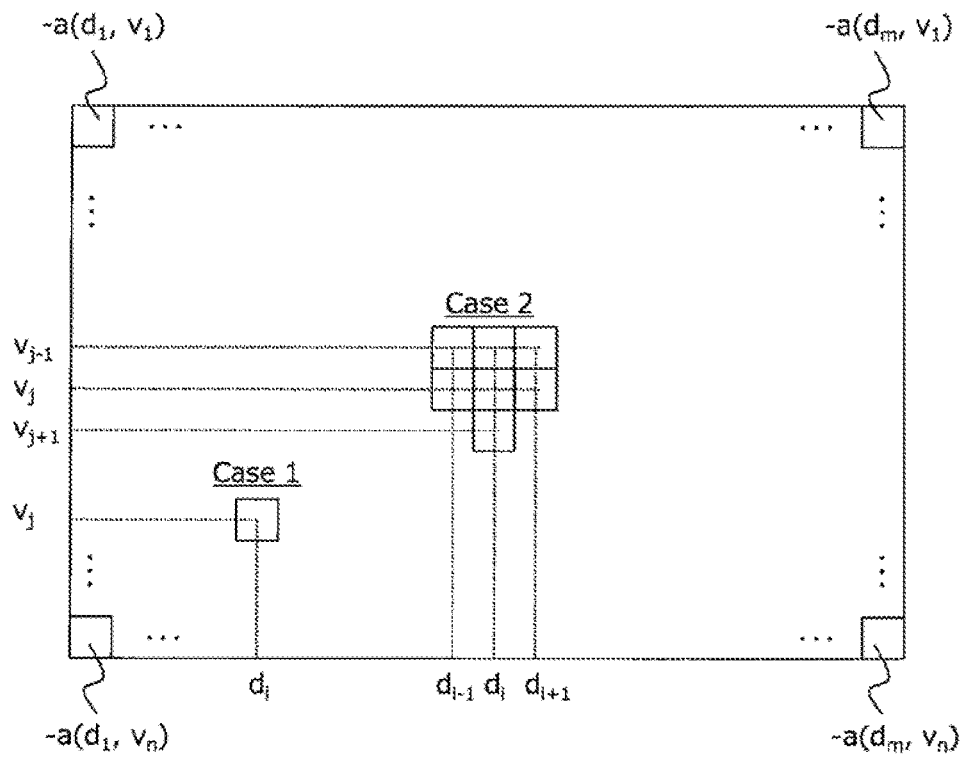
FIG. 10 is a diagram for illustrating an example to specify a segmented area to which a minimum value cell belongs.

(iv) Perform the slowdown by changing the minimum value $-a_{M1}\_\min$ in accordance with the plausibility $\eta$ of the minimum value cell FIG. 10 is a diagram for illustrating an example to specify the segmented area to which the minimum value cell belongs. In FIG. 10, the first and second cases (Cases 1 and 2) are shown. In the first case, only one deceleration $-a (d_i, v_j)$ is the request value. Therefore, in the first case, the deceleration $-a (d_i, v_j)$ corresponds to the minimum value $-a_{M1}\_\min$. Then, by comparing the minimum value $-a_{M1}\_\min$ with the boundary deceleration, the minimum value $-a_{M1}\_\min$ is allocated to one of the four segmented areas.

Here, the fact that only one deceleration $-a (d_i, v_j)$ corresponds to the request value indicates that the plausibility $\eta$ of the minimum value $-a_{M1}\_\min$ is greater than the threshold $\eta\_th1$. Considering this suggestion, it is possible to specify which of the phase I to V the segmented area to which the minimum value cell belongs.

In the second case, the deceleration $-a (d_{i-1}, v_{j-1})$, $-a (d_{i-1}, v_j)$, $-a (d_i, v_{j-1})$, $-a (d_i, v_j)$, $-a (d_i, v_{j+1})$, $-a (d_{i+1}, v_{j-1})$, and $-a (d_{i+1}, v_j)$ are the request value. Therefore, in the second case, a most rapid deceleration of these request values is the minimum value $-a_{M1}\_\min$. Therefore, by comparing the minimum value $-a_{M1}\_\min$ and the boundary deceleration, the minimum value $-a_{M1}\_\min$ is allocated to one of the four segmented areas described above.

Here, the fact that the seven request value exist indicates that the plausibility $\eta$ of the minimum value $-a_{M1}\_\min$ is between the thresholds $\eta\_th0$ and th1. Considering this suggestion, it is possible to specify which of the phase I to V the segmented area to which the minimum value cell belongs.

The detection portion 133 detects the object based on the information detected by the external sensor 12. The detection portion 133 extracts the information on the state of the slowdown target OBJ from the information on the detected object. The detection portion 133 also transmits the extracted information to the calculation portions 131 and 134.

The calculation portion 134 calculates the plausibility $\eta$ of the state of the slowdown target OBJ. The plausibility $\eta$ is calculated as a probability L of a plausibility model with a probability $\rho$ is used as a variable that the state of the deceleration target OBJ is correctly detected. If there are more than one state of the slowdown target OBJ, the plausibility $\eta$ is calculated for each of these states. The calculation portion 134 transmits the calculated plausibility $\eta$ to the planning portion 135.

The planning portion 135 plans the driving plan of the automated driving. The planning of the driving plan is executed by repeatedly setting the driving trajectory TP every time the preset time has elapsed, with the current time as a reference. The method to set the driving trajectory TP is not particularly limited, and a known method can be applied. When receiving the driving policy from the decision portion 132, the planning portion 135 changes the information on the driving state in the target position while referring to the plausibility q from the calculation portion 134 appropriately. The planning portion 135 transmits to the control portion 136 the information on the driving trajectory TP including the information on the driving state.

From the decision portion 132, one of the driving policies (i) to (iv) is transmitted. The planning portion 135 reflects the minimum value $-a_{M1}\_\min$ to the target acceleration $a_{M1}\_tgt$, depending on the contents of the received driving policy. Specifically, when the driving policy (i) is received, the planning portion 135 immediately reflects the minimum value $-a_{M1}\_\min$ to the target acceleration $a_{M1}\_tgt$. The planning portion 135 also immediately reflects the minimum value $-a_{M1}\_\min$ when it receives the driving policy (iii) and the plausibility $\eta$ of the minimum value cell is equal to or greater than threshold $\eta\_th2$.

When the driving policy (ii) is received, the planning portion 135 prohibits the minimum value $-a_{M1}\_\min$ from being reflected to the target acceleration $a_{M1}\_tgt$. When the driving policy (iii) is received and the plausibility $\eta$ of the minimum value cell is less than the threshold $\eta\_th2$, the planning portion 135 prohibits the minimum value $-a_{M1}\_\min$ from being reflected.

When the driving policy (iv) is received, the planning portion 135 changes the minimum value $-a_{M1}\_\min$ according to the plausibility $\eta$ of the minimum value cell. The change of the minimum value $-a_{M1}\_\min$ is performed by multiplying a coefficient $\alpha$ by the minimum value $-a_{M1}\_\min$.

The control portion 136 determines control amount of the various driving devices based on the information on the driving state such that the vehicle M1 runs on the driving trajectory TP. The driving device is an electronically controlled device and includes a driving force for running output device, a steering device and a brake device.

1.4 Processing Example Executed by ECU

Figure 11:
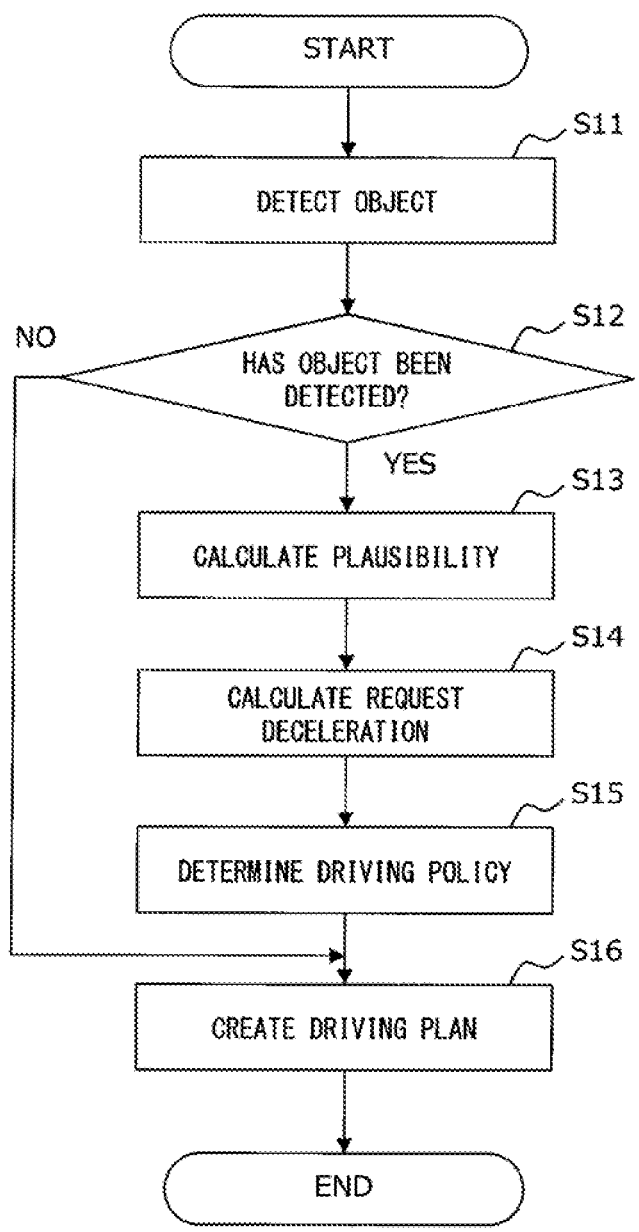
FIG. 11 is a flowchart for illustrating a flow of processing which is executed by an ECU for automated driving control in the first embodiment.

FIG. 11 is a flowchart for illustrating a processing flow executed by the ECU 13 to execute the automated driving control. In the routine shown in FIG. 11, the ECU 13 first detects the object (step S11). Specifically, the ECU 13 detects the object based on the information detected by the external sensor 12.

Subsequent to the processing of the step S11, the ECU 13 determines whether or not the obstacle has been detected (step S12). Specifically, the ECU 13 determines whether or not the information on the state of the slowdown target OBJ is included in the information on the object detected in the processing of the step S11. If the judgement result of the step S12 is negative, the ECU 13 proceeds to the step S16.

If the judgement result of the step S12 is positive, the ECU 13 calculates the plausibility $\eta$ of the state of the slowdown target OBJ (step S13). Specifically, the ECU 13 extracts from the information on the object the information on the state of the slowdown target OBJ and calculates the plausibility q. If more than one information on the state of the slowdown target OBJ is included in the information on the object, the ECU 13 calculates the plausibility $\eta$ for each of these states.

Subsequent to the processing of the step S13, the ECU 13 calculates the request deceleration (step S14). Specifically, the ECU 13 calculates the request deceleration (i.e., the request value of the deceleration $-a_{M1}$) by referring to the deceleration map 14 using the extracted information on the state of the slowdown target OBJ.

Subsequent to the processing of the step S14, the ECU 13 determines the driving policy (step S15). Specifically, the ECU 13 calculates the minimum value $-a_{M1}\_min$ based on the request deceleration calculated in the step S14. Next, the ECU 13 specifies the segmented area to which the minimum value cell belongs. Then the ECU 13 determines the driving policy based on the specified segmented area. When the minimum value $-a_{M1}\_min$ matches the boundary deceleration, for example, the segmented area is specified as follows. First, roman numerals of the phases I to V, which are divided by the boundary deceleration are compared. Then a segmented area corresponding to the phase having a smaller roman numeral is defined as the segmented area to be specified.

In the step S16, the ECU 13 plans the driving plan. Specifically, the ECU 13 sets the driving trajectory TP repeatedly every preset time elapses. When the driving policy is determined in the step S15, the plausibility $\eta$ which was calculated in the step S13 is appropriately referenced, and then the minimum value $-a_{M1}\_min$ is reflected to the target acceleration $a_{M1}\_tgt$ with the reflection degree of 0 to 100%. In this way, the driving state in the target position is updated.

1.5 Another System Configuration Example

In another system configuration example, a deceleration model is used instead of the deceleration map 14 shown in FIG. 8. The deceleration model is constructed based on the relationship between the state of the slowdown target OBJ (i.e., the distance d and the relative speed v) and the deceleration $-a_{M1}$. Therefore, according to the deceleration model, by inputting the state of the slowdown target OBJ into deceleration model, it is possible to calculate the deceleration $-a_{M1}$ in the same way as the calculation using the deceleration map 14. That is, according to the deceleration model, it is possible to calculate the deceleration $-a_{M1}$ without using the deceleration map 14. Note that the configuration example in which the deceleration model is used is also applied to the embodiments described later.

2. Second Embodiment

Next, a second embodiment will be described with reference to FIGS. 12 to 17. Note that descriptions overlapping with those in the first embodiment are omitted as appropriate.

2.1 Assumption

Figure 12:
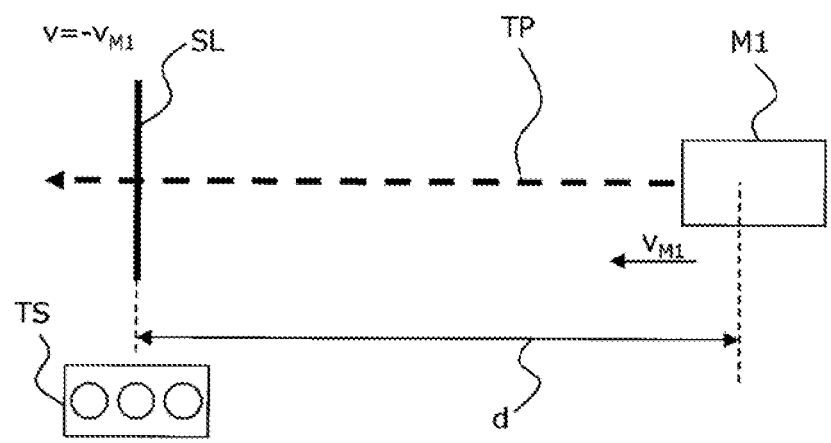
FIG. 12 is a diagram for illustrating a situation where a second embodiment is assumed.

FIG. 12 a diagram for illustrating a situation where the second embodiment is assumed. On the vehicle M1 shown in FIG. 12, a vehicle control system according to the second embodiment (hereinafter also referred to as a "system" in the second embodiment) is mounted.

In front of the vehicle M1 by the distanced, there is a stop line SL. The stop line SL is a line attached to a nearest traffic signal TS of the vehicle M1 on the driving trajectory TP. The fact that the traffic light TS is the nearest traffic signal is specified based on the positional information of the vehicle M1 and the map information. According to the positional information of the vehicle M1 and the map information, the distance d is also specified. Note that there is no moving or static obstacle between the stop line SL and the vehicle M1. The situation where the moving or static obstacle exists corresponds to the situation described in FIG. 1.

The slowdown target OBI of the first embodiment is a nearest moving or static obstacle. In contrast, the slowdown target OBJ of the second embodiment is the traffic signal TS. When the slowdown target OBJ is the traffic signal TS, the state of the slowdown target OBJ is the distance d from the traffic light TS (more precisely, the stop line SL) to the vehicle MA and the relative speed v of the traffic signal TS (more precisely, the stop line SL) to the vehicle M1. Here, the distance d is specified based on the positional information of the vehicle M1 and the map information. The relative speed v is represented by $-v_{M1}$. That is, if the slowdown target OBJ is the traffic signal TS, the accuracy on the detection of the state of it is expected to be high enough. In the second embodiment, the plausibility $\eta$ is associated with the state of the traffic signal TS that indicates an accuracy of the detection of lighting color Cs (red or yellow; the same shall apply hereinafter) of the traffic signal TS.

2.2 Characteristic of Second Embodiment

When the slowdown target OBJ is the traffic signal TS, the deceleration feature shown in FIG. 2 is understood as the relationship between the distance d and the relative speed v after detecting red or yellow signal. Further, the stopping position shown in FIG. 2 is replaced by the position of the stop line SL. Then, the combinations of the distance d and the relative speed v when the lighting color Cs is not detected by the camera should be represented in the deceleration feature. In addition, these combinations when the lighting color Cs is fully detected by the camera should be represented in the deceleration feature.

In the following explanation of the second embodiment, among the coordinate (d, v) corresponding to the state of the traffic signal TS, the coordinate (d, v) having the plausibility $\eta$ of the lighting color Cs greater than the threshold $\eta\_th0$ is referred to as the "coordinate (d, v|$\eta$)".

2.2.1 Determination of Driving Policy

The determination of the driving policy is based on the single coordinate (d, v|$\eta$). The reason for expressing the "single coordinate (d, v|η)" is that the distance d and the relative speed v are always specified in the second embodiment. And, as described in the first embodiment, when there is only one coordinate (d, v|η), the deceleration $-a_{M1}$ corresponding to the coordinate (d, v|η) can be regarded as the substantial minimum value $-a_{M1}\_min$. Therefore, in the following description of the second embodiment, the coordinate (d, v|η) having the minimum value $-a_{M1}\_min$ is referred to as the "coordinate (d, v|η|$-a_{M1}\_min$)".

Figure 13:
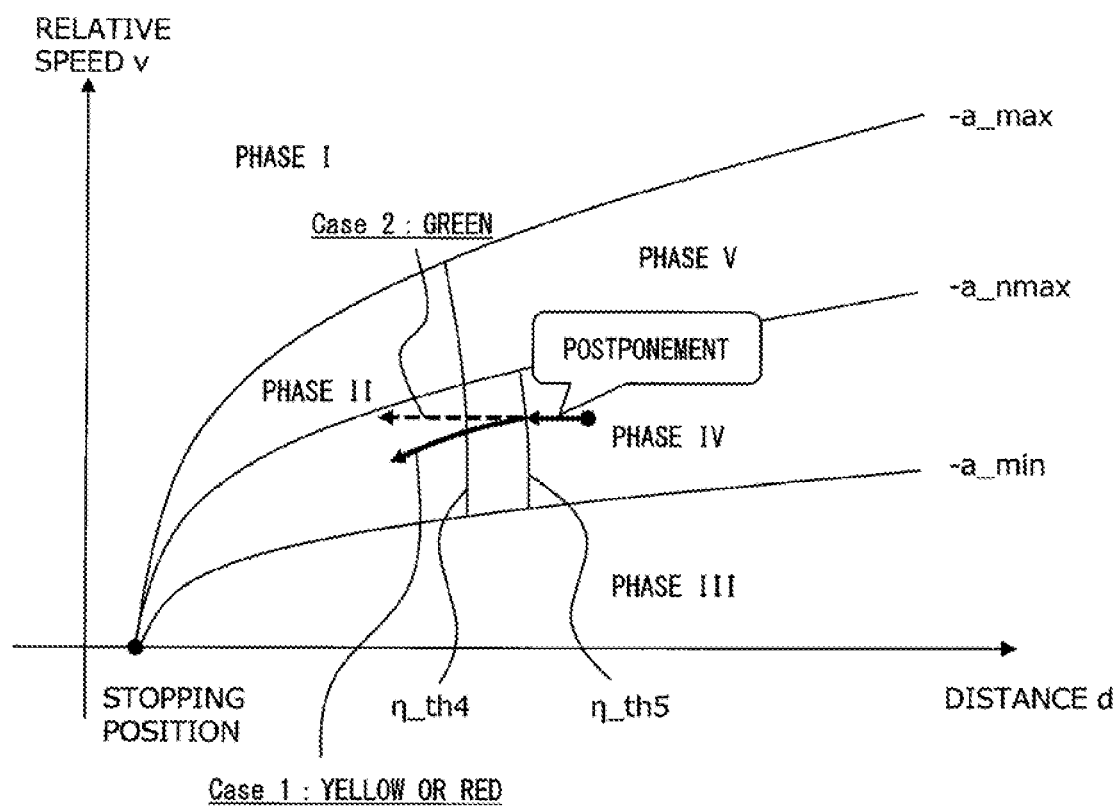
FIG. 13 is a diagram for explaining a determination example of the driving policy in the second embodiment.
Figure 14:
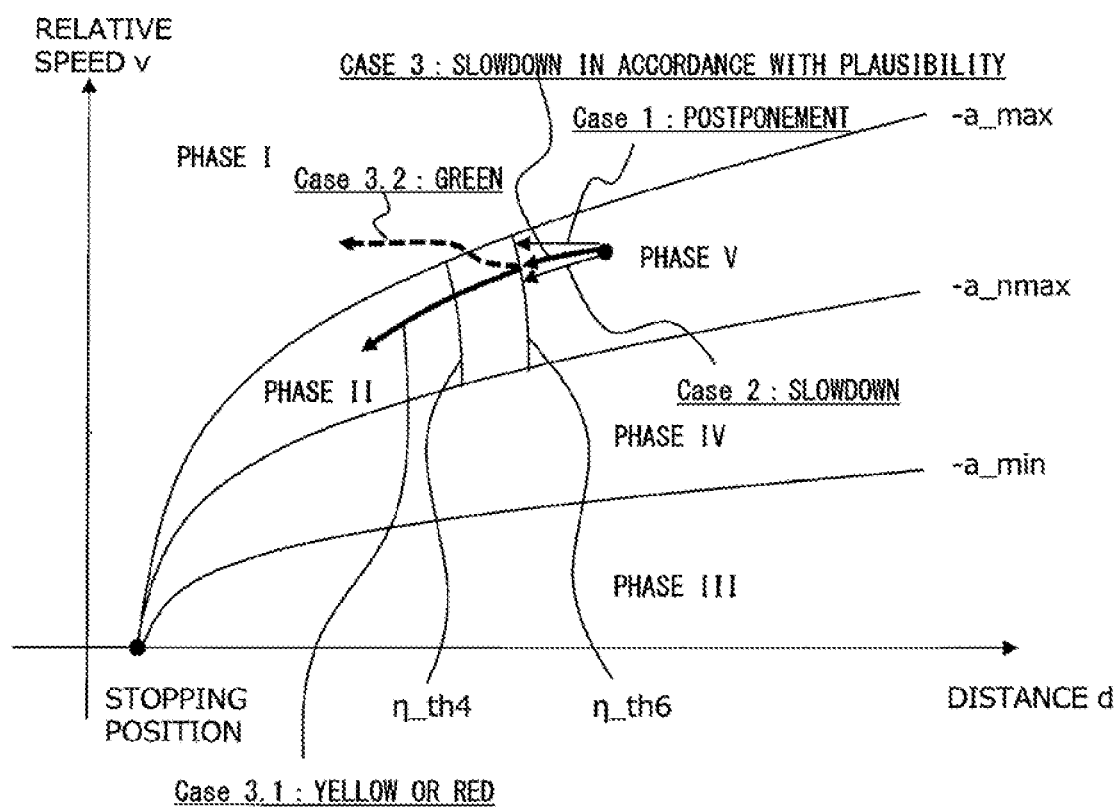
FIG. 14 is a diagram for explaining the determination example of the driving policy in the second embodiment.

Here, the threshold η_th which is used in the description of the example in which the driving policy is determined will be described. In FIGS. 13 and 14, the phases I to V described in FIG. 5 are drawn. In these figures, curves of thresholds η_th4, η_th5, and η_th6 are also drawn. The threshold η_th 4 corresponds to the plausibility η when the lighting color Cs is completely detected by the camera. The threshold η_th4 satisfies η_th4>η_th0. The threshold η_th 5 corresponds to the plausibility η when a certain accuracy is observed in the detection of the lighting color Cs by the camera. The threshold η_th5 satisfies η_th0<η_th5<η_th4. The definition of the threshold η_th6 is the same as that of the threshold η_th5. The threshold η_th6 may be the same value as the threshold η_th5 or may be different value from the threshold η_th5.

If the coordinate (d, v|η|$-a_{M1}\_min$) exists in the phase 1, the driving policy is determined to "slowdown the M1 immediately with the minimum value $-a_{M1}\_min$". This is because to stop the vehicle M1 in front of the stop line SL. Thus, if the coordinate (d, v|η|$-a_{M1}\_min$) exists in the phase I, the driving policy is selected to prioritize the driving safety than the driving efficiency.

If the coordinate (d, v|η|$-a_{M1}\_min$) exists in the phase III, the driving policy is determined to "maintain current acceleration or deceleration". This is because there is a possibility that the vehicle M1 is able to stop in front of the stop line SL without performing the slowdown of the vehicle M1. Thus, if the coordinate (d, v|η|$-a_{M1}\_min$) exists in the phase III the driving policy is selected to prioritize the driving efficiency than the driving safety. In this case, "speedup of the vehicle M1 such that the driving speed $v_{M1}$ does not exceed an upper limit" may be applied as the driving policy.

If the coordinate (d, v|η|$-a_{M1}\_min$) exists in the phase IV, the driving policy is determined to "postpone the start of the slowdown until the plausibility η of the lighting color Cs of coordinate (d, v|η|$-a_{M1}\_min$) becomes equal to or greater than the threshold η_th5". This is because there is a possibility that the vehicle M1 is able to stop in front of the stop line SL even if the slowdown of the vehicle M1 is not performed immediately. Thus, if the coordinate (d, v|η|$-a_{M1}\_min$) exists in the phase IV, the driving policy is selected to perform appropriate travel in accordance with the current situation.

If the coordinate (d, v|η|$-a_{M1}\_min$) exists in the phase II or V, the driving policy is determined to "slowdown immediately with the minimum value $-a_{M1}\_min$ if the plausibility of the lighting color Cs of the coordinate (d, v|η|$-a_{M1}\_min$) is equal to or greater than the threshold η_th4, otherwise slowdown by changing the minimum value $-a_{M1}\_min$ according to the plausibility η". Unlike the first embodiment, in the second embodiment, the single coordinate (d, v|η) is always specified. On the other hand, when the coordinate (d, v|η|$-a_{M1}\_min$) is specified, it is not possible to narrow down whether this coordinate exists in the phase II or V. Therefore, in the second embodiment, a judgment element for narrowing down the coordinate is added to the driving policy.

2.2.2 Reflection of Driving Policy

Focusing on the minimum value phase, the driving policy of the second embodiment is summarized as follows.

The phase I: immediately perform the slowdown of the vehicle M1 with the minimum value $-a_{M1}\_min$.

The phase III: maintain the current acceleration or deceleration

The phase IV: postpone the start of the slowdown until the plausibility η of the lighting color Cs of the coordinate (d, v|η|$-a_{M1}\_min$) becomes equal to or greater than the threshold η_th5.

The phase II or V: immediately perform the slowdown of the vehicle M1 with the minimum value $-a_{M1}\_min$ if the plausibility η of the lighting color Cs of the coordinate (d, v|η|$-a_{M1}\_min$) is equal to or greater than the threshold η_th4, otherwise perform the slowdown by changing the minimum value $-a_{M1}\_min$ according to the plausibility η

According to the driving policy in the phase I, the minimum value $-a_{M1}\_min$ is immediately reflected to the target acceleration $a_{M1}\_tgt$. On the other hand, according to the driving policy in the phase III, the minimum value $-au$ min is not reflected to the target acceleration $a_{M1}\_tgt$ at all. Thus, the reflection degree according to the driving policy in the phase I is 100% whereas that in the phase III is 0%.

According to the driving policy in the phase IV, the reflection degree is changed in accordance with a result of comparing with threshold η_th5. FIG. 13 is a diagram for explaining the driving policy in the phase IV. In FIG. 13, the phases I to V described in FIG. 4 are drawn. The black circle shown in the phase IV of FIG. 13 represents the coordinate (d, v|η|$-a_{M1}\_min$). In the example shown in FIG. 13, it is assumed that the plausibility η of the coordinate increases to a value equal to or greater than the threshold η_th5 during a process in which the vehicle M1 approaches the stop line SL (hereinafter referred to as an "approaching process" in the following explanation of the second embodiment).

According to the driving policy in the phase IV, if the plausibility η of the lighting color Cs of the coordinate (d, v|η|$-a_{M1}\_min$) is less than the threshold η_th5, the minimum value $-a_{M1}\_min$ is not reflected to the target acceleration $a_{M1}\_tgt$. On the other hand, if the plausibility η of the lighting color Cs of the coordinate (d, v|η|$-a_{M1}\_min$) is equal to or greater than the threshold η_th5, the minimum value $-a_{M1}\_min$ is reflected to the target acceleration $a_{M1}\_tgt$. As described above, according to the driving policy in the phase IV, the reflection degree is switched between 0% and 100%.

In FIG. 13, two types of trajectories are drawn on the left of the threshold η_th5. The trajectory shown in the solid line (i.e., Case 1) represents the approaching process when the detection of the lighting color Cs was correct (i.e. the lighting color Cs was red or yellow). The trajectory shown in the broken line (i.e., Case 2) represents the approaching process where the detection was really wrong (i.e., the lighting color Cs was green). It is to be noted that, as described in FIG. 5, this broken line trajectory is a trajectory for convenience.

According to the driving policy in the phase II or V, the reflection degree is changed in accordance with the result of comparing with the threshold η_th4 and the plausibility η of the lighting color Cs of the coordinate (d, v|η|$-a_{M1}\_min$). If the plausibility η of the lighting color Cs of the coordinate (d, v|η|$-a_{M1}\_min$) is equal to or greater than the threshold η_th4, the minimum value $-a_{M1}\_min$ is reflected to the target acceleration $a_{M1}\_tgt$. As described above, according to the driving policy in the phase II or V, the reflection degree is 100% when the plausibility η of the lighting color Cs of the coordinate (d, v|η|−$a_{M1}$_min) is equal to or larger than the threshold η_th4.

On the other hand, if the plausibility η of the lighting color Cs of the coordinate (d, v|η|−$a_{M1}$_min) is less than the threshold η_th4, the minimum value −$a_{M1}$_min is changed in accordance with the plausibility η of the lighting color Cs of the coordinate (d, v|η|−$a_{M1}$_min). FIG. 14 is a diagram for illustrating a method in which the minimum value −$a_{M1}$_min is changed in accordance with the plausibility η of the lighting color Cs of the coordinate (d, v|η|−$a_{M1}$_min). In FIG. 14, three types of trajectories are drawn on the right of the threshold η_th6. The first and second trajectories (i.e., Cases 1 and 2) are the same as in the trajectories shown in FIG. 6. The third trajectory (i.e., Case 3) represents the approaching process in which the slowdown is performed with the minimum value −$a_{M1}$_min obtained by multiplying a coefficient β (0<β<1). The coefficient β is designed to approach 1 as the plausibility η of the lighting color Cs of the coordinate increases. From the above, the reflection degree according to the driving policy in the phase II or V is 100·β % when the plausibility η of the lighting color Cs of the coordinate (d, v|η|−$a_{M1}$_min) is less than the threshold η_th4.

In FIG. 14, two types of the trajectories are additionally drawn on the left of the threshold η_th6. The trajectory shown in the solid line (i.e., Case 3.1) represents the approaching process where the detection of the lighting color Cs was correct. The trajectory shown in the broken line (i.e., Case 3.2) represents the approaching process where the detection was really wrong. The beginning of trajectories in the cases 3.1 and 3.2 lead to an end of the trajectory in the case 3. Therefore, when comparing the cases 1 to 3, feeling of strangeness on the running behavior of the vehicle M1 is suppressed in the case 3.

2.2.3 Effect

According to the characteristics of the second embodiment, it is possible to obtain effects equivalent to those in the first embodiment. That is, even when the detection of the lighting color Cs is uncertain, it is possible to execute the automated driving control in which the driving safety and the driving efficiency are compatible with each other.

2.3 Vehicle Control System

Next, a configuration example of the system in which the automated driving control including the characteristic processing is executed will be described.

2.3.1 System Configuration Example

Figure 15:
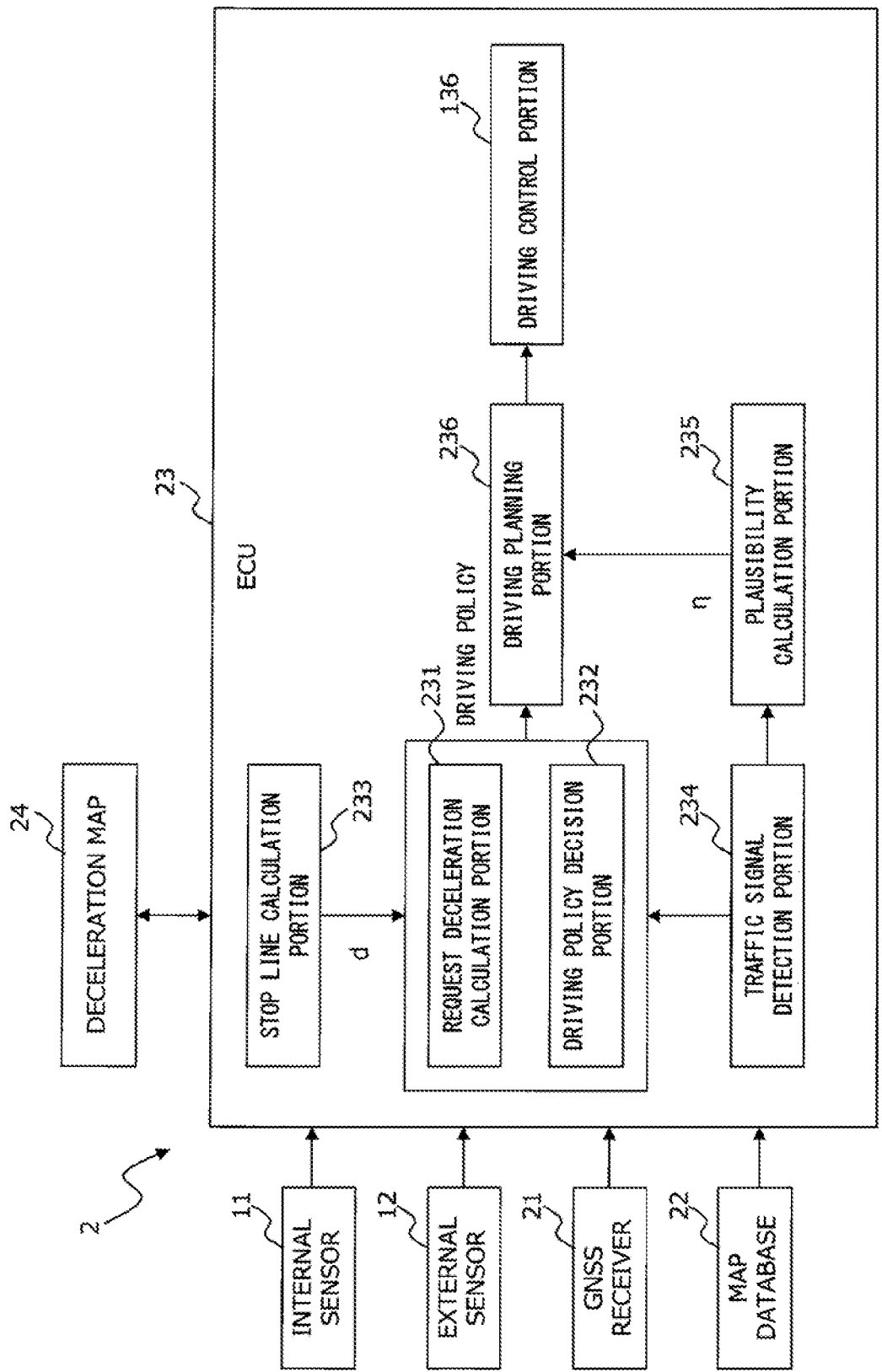
FIG. 15 is a block diagram for showing a configuration example of a vehicle control system according to first embodiment.

FIG. 15 is a block diagram for showing a configuration example of the system according to the second embodiment. As shown in FIG. 15, a system 2 includes a GNSS (Global Navigation Satellite System) receiver 21, a map database 22, an ECU 23, and a deceleration map 24. The internal sensor 11 and the external sensor 12 are common to the configuration example of the system 1 shown in FIG. 8.

The GNSS receiver 21 is a device that receives signals from three or more satellites. The GNSS receiver 21 is also a device to obtain the position of the vehicle M1. The GNSS receiver 21 calculates the position and orientation of the vehicle M1 based on the received signals. The GNSS receiver 21 transmits the calculated information to the ECU 23.

The map database 22 is a data base in which map information is stored. The map information include positional information on roads, road shape information (e.g., curve, line type and curvature), positional information on intersections and divergent points, and positional information on constructions. The map information also includes information on the traffic regulation. The information on the traffic regulation includes a statutory speed which is associated with the positional information on the roads. The map information may include information on regions where the automated driving control is executable. The map database 22 is formed in a storage device (e.g., a hard disk and a flash memory) mounted on the vehicle M1. The map database 22 may be formed in the computer of the facility (e.g., a management center) capable of communicating with the vehicle M1.

The information on the position and orientation of the vehicle M1 and the map information are included in the driving environment information of the vehicle M1. That is, the GNSS receiver 21 and the map database 22 are included in the "acquiring device to acquire the driving environment information".

A hardware configuration of the ECU 23 is the same as that of the ECU 13 described in FIG. 8. A functional configuration of the ECU 23 will be described in detail in section "2.3.2".

The deceleration map 24 is a cell map in which the relationship between the state of the slowdown target OBJ and the deceleration −$a_{M1}$ is defined. The basic configuration of the deceleration map 24 is the same as that of the deceleration map 14 described in FIG. 9. That is, each of cells ($d_i$, $v_j$) in the deceleration map 24 has the deceleration −$a_{M1}$. Each of the cells ($d_i$, $v_j$) is allocated to four segmented area by the boundary deceleration.

2.3.2 Configuration Example of ECU

As shown in FIG. 15, the ECU 23 includes a request deceleration calculation portion 231, a driving policy decision portion 232, a stop line calculation portion 233, a traffic signal detection portion 234, a plausibility calculation portion 235, and a driving planning portion 236. The driving control portion 136 is common to the ECU 13 shown in FIG. 8. These function blocks are realized when the processor of the ECU 23 executes various control programs stored in the memory. Hereinafter, for convenience of explanation, the request deceleration calculation portion 231, the driving policy decision portion 232 and the like are abbreviated as the "calculation portion 231", the "decision portion 232" and the like.

The calculation portion 231 calculates the request value of the deceleration −$a_{M1}$. The request value is calculated by referring to the deceleration map 24. The deceleration map 24 is referenced by using the information on the state of the slowdown target OBJ. As mentioned above, the calculation of the request value executed by the calculation portion 231 is essentially the same as that executed by the calculation portion 131 described in FIG. 8. The calculation portion 231 transmits the request value to the decision portion 232.

The decision portion 232 determines the driving policy. The decision portion 232 first specifies the minimum value −$a_{M1}$_min based on the request value transmitted from the calculation portion 231. The decision portion 232 then determines any of (i) to (iv) below as the driving policy based on the segmented area to which the cell having minimum value −$a_{M1}$_min (referred to as a "minimum value cell" in the following description of the second embodiment) belongs and transmits it to the planning portion 236.

(i) Perform the slowdown the vehicle M1 immediately with the minimum value $-a_{M1\_min}$ (ii) Maintain current acceleration or deceleration (iii) Postpone the start of the slowdown until the plausibility η of the lighting color Cs of the minimum value cell becomes equal to or greater than the threshold η_th5

(iv) Perform the slowdown of the vehicle M1 immediately with the minimum value $-a_{M1\_min}$ when the plausibility of the lighting color Cs of the minimum value cell is equal to or greater than the threshold η_th4, otherwise perform the slowdown by changing the minimum value $-a_{M1\_min}$ in accordance with the plausibility η

Figure 16:
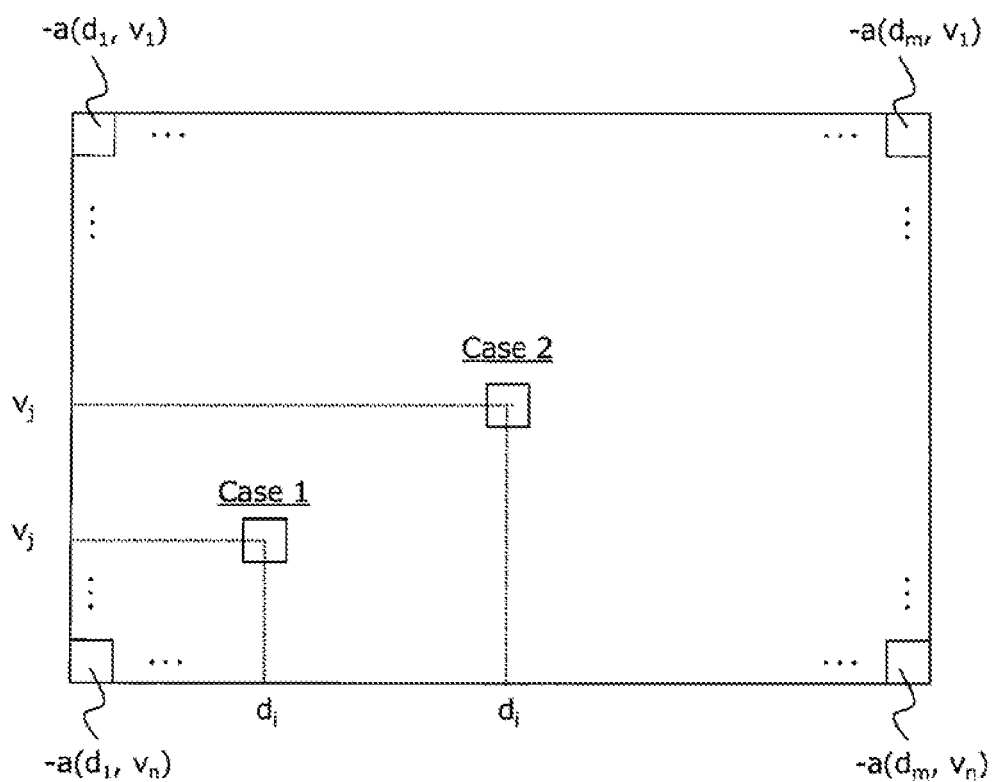
FIG. 16 is a diagram for illustrating an example to specify a segmented area to which a minimum value cell belongs.

FIG. 16 is a diagram for illustrating an example to specify the segmented area to which the minimum value cell belongs. In FIG. 16, the first and second cases are shown. In all of these cases, only the deceleration $-a$ ($d_i$, $v_j$) is applicable to the request value. The reason for this is that the plausibility η of the state of traffic signal TS is expected to be sufficiently high. Therefore, the deceleration $-a$ ($d_i$, $v_j$) corresponds to the minimum value $-a_{M1\_min}$. And by comparing the minimum value $-a_{M1\_min}$ with the boundary deceleration, the minimum value $-a_{M1\_min}$ is allocated to one of the four segmented areas.

The calculation portion 233 calculates the distance (i.e., the distance d) from the vehicle M1 to the stop line SL. The distanced is calculated based on the positional information of vehicle M1 and the map information. The positional information of the vehicle M1 is obtained from the GNSS receiver 21. The map information is obtained from the map database 22.

The detection portion 234 detects a lighting state of traffic signal TS (e.g., green, yellow, red or unknown). The lighting state is detected, for example, as follows. First, the traffic signal TS is extracted from the image captured by the camera. Then, based on the brightness of the extracted traffic signal TS, the lighting state is determined. If the brightness of red is highest, the lighting state is determined to be red. The detection portion 234 transmits the detected lighting state to the calculation portions 231 and 235.

The calculation portion 235 calculates the plausibility η of the lighting color Cs. The plausibility η of the lighting color Cs is calculated as, for example, the probability L of the plausibility model in which a probability ρ is used as a variable that a red or yellow signal is correctly detected based on brightness of the traffic light TS. The calculation portion 235 transmits the calculated plausibility η of the lighting color Cs to the planning portion 236.

The planning portion 236 plans the driving plan of the automated driving. The basic function of planning portion 236 is the same as that of the planning portion 135 described in FIG. 8. When receiving the driving policy from the decision portion 232, the planning portion 236 changes the information on the driving state in the target position while referring to the plausibility η of the lighting color Cs from the calculation portion 235 appropriately. The planning portion 236 transmits to the control portion 136 the information on the driving trajectory TP including the information on the driving state.

2.2 Processing Example Executed by ECU

Figure 17:
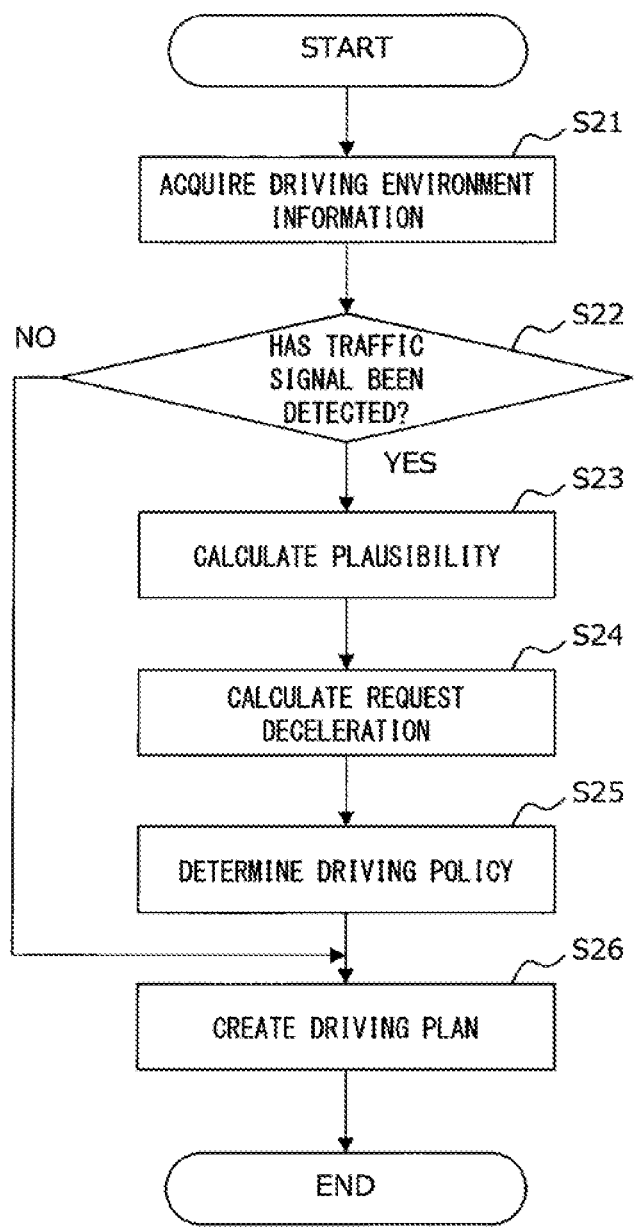
FIG. 17 is a flowchart for illustrating a flow of processing which is executed by the ECU for automated driving control in the second embodiment.

FIG. 17 is a flowchart illustrating a processing flow executed by the ECU 23 to execute the automated driving control. In the routine shown in FIG. 17, the ECU 23 first acquires the driving environment information (step S21). Specifically, the ECU 23 acquires the information on the driving state of the vehicle M1 and the information on the situation around the vehicle M1. The ECU 23 also acquires the positional information of the vehicle M1 and the map information.

Subsequent to the processing of the step S21, the ECU 23 determines whether the traffic signal TS and the stop line SL have been detected (step S22). Specifically, the ECU 23 determines whether or not the information acquired in the step S21 includes the information on the traffic signal TS and the stop line SL. If the judgement result of the step S22 is negative, the ECU 23 proceeds to the step S26.

If the judgement result of the step S22 is positive, the ECU 23 calculates the plausibility η of the lighting color Cs (step S23). Specifically, the ECU 23 extracts the traffic signal TS from the image captured by the camera and then calculates the plausibility η of the lighting color Cs.

Subsequent to the processing of the step S23, the ECU 23 calculates the request deceleration (step S24). Specifically the ECU 23 calculates the request deceleration (i.e., the request value of the deceleration $-a_{M1}$) based on the distance d between the traffic signal TS and the vehicle M1 and the reference with the deceleration map 24 using the relative speed v of the traffic light TS to the vehicle M1.

Subsequent to the processing of the step S24, the ECU 23 determines the driving policy (step S25). Specifically, the ECU 23 sets the request deceleration which was calculated in the step S24 to the minimum value $-a_{M1\_min}$. Next, the ECU 23 specifies the segmented area to which the minimum value cell belongs. Then the ECU 23 determines the driving policy based on the specified segmented area.

In the step S26, the ECU 23 plans the driving plan. Specifically, the ECU 23 sets the driving trajectory TP repeatedly every preset time elapses. When the driving policy is determined in the step S25, the plausibility η which was calculated in the step S23 is appropriately referenced, and then the minimum value $-a_{M1\_min}$ is reflected to the target acceleration $a_{M1\_tgt}$ with the reflection degree of 0 to 100%. In this way, the driving state in the target position is updated.

3. Third Embodiment

Next, a third embodiment will be described with reference to FIGS. 18 to 21. Note that descriptions overlapping with those in the first embodiment are omitted as appropriate.

3.1 Assumption

Figure 18:
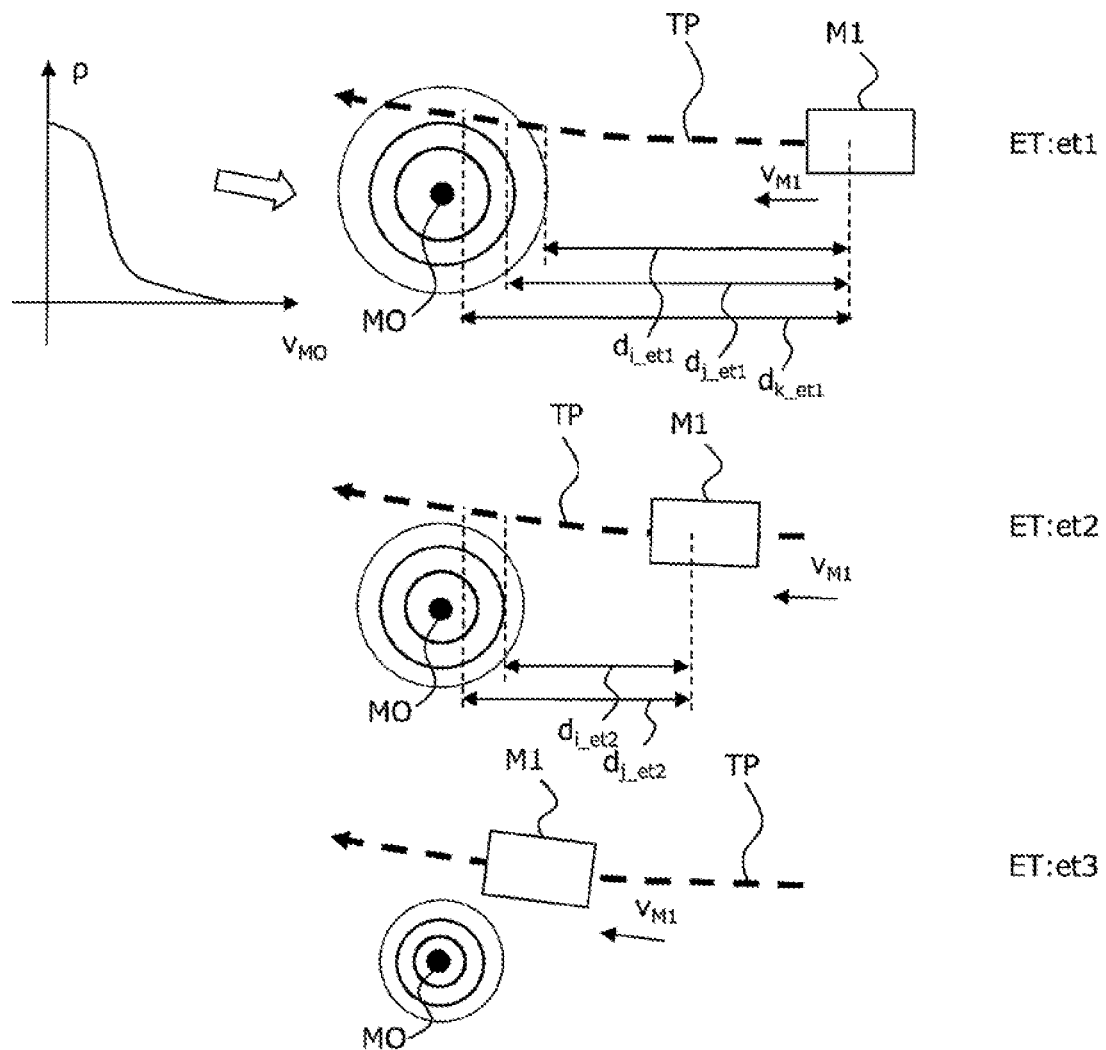
FIG. 18 is a diagram for illustrating a situation where a third embodiment is assumed.

FIG. 18 is a diagram for illustrating a situation where the third embodiment is assumed. On the vehicle M1 shown in FIG. 18, a vehicle control system according to the third embodiment (hereinafter also referred to as a "system" in the third embodiment) is mounted.

As shown in FIG. 18, a moving body MO exists in front of the vehicle M1 and to a side of the driving trajectory TP. The moving body MO is a nearest moving body of the vehicle M1. Examples of the moving body MO include a walker and a bicycle. Note that there is no moving or static obstacle between the moving body MO and the vehicle M1. The situation where the moving or static obstacle exists corresponds to the situation described in FIG. 1. Further, there is no traffic signal TS between the moving body MO and the vehicle M1. The situation where the traffic signal TS exists corresponds to the situation described in FIG. 12.

The upper, middle and lower stage of FIG. 18 represent a process in which the vehicle M1 gradually approaches the side of the moving body MO. The difference among the upper, middle and lower stages of FIG. 18 are in the estimated time ET. The estimated time ET is a time at which the vehicle M1 running on the driving trajectory TP is expected to reach the side of the moving body MO.

Assume that moving body MO moves in accordance with a predetermined speed distribution model. Then, ranges in which the moving body MO may exist before the estimated time ET elapses are concentrically drawn with a spread according to an existence probability of the moving body MO. Here, consider an intersection of the circumference of each circle and a predetermined position of the vehicle M1 (e.g., a position of a left front part of the vehicle M1) when the estimated time ET has elapsed. Thus, the fact that the intersection is obtained means that the moving body MO has a possibility to cross the driving trajectory TP and become the slowdown target OBJ before the estimated time ET has elapsed.

The current distance from the predetermined position of the vehicle M1 to the intersection can be treated in the same row as the distance d from the vehicle M1 to the vehicle M2 described in the first embodiment. In the example shown in FIG. 18, distances di_et1, dj_et1 and dk_et1 are represented as the distance d when the estimated time ET is et1. Further, distances di_et2 and dj_et2 are represented as the distance d when the estimated time ET is et2. Hereinafter, the distanced calculated for each estimated time ET (t1, t2, . . . ) is collectively referred to as a "distance d_et".

3.2 Characteristic of Third Embodiment

If the moving body MO may be the slowdown target OBJ, then the deceleration feature shown in FIG. 2 is understood as a diagram which indicates a relation between the distance d_et and the relative speed v calculated when the moving body MO is assumed to cross the driving trajectory TP. In addition, the stop position shown in FIG. 2 is replaced with a position separated by a given distanced $_\theta$ from the moving body MO that crosses the driving trajectory TP.

Then, these distances d_et are associated with the existence probability of the moving body MO being calculated in accordance with the speed distribution model. For this reason, in third embodiment, a probability that the moving body MO exists at the distance d_et from the vehicle M1 on the driving trajectory TP before the estimated time ET has elapsed is represented by η. In the following explanation of the third embodiment, among the coordinates (d, v) that correspond to the state of the moving body MO until the estimated time ET has elapsed, the coordinate (d, v) in which the probability that the moving body MO exists at the position d_et away from the vehicle M1 on the driving trajectory TP is η is referred to as a "coordinate (d, v|η)".

3.2.1 Determination of Driving Policy

The driving policy is determined for each estimated time ET. The determination of the driving policy of the third embodiment is the same as that of the first embodiment, except that the driving policy is determined for each estimated time ET. For convenience of explanation, the minimum value $-a_{M1}$_min specified for each estimated time ET is collectively referred to as a "minimum value $-a_{M1}$_min_et". When the estimated time ET is specifically represented, the minimum value $-a_{M1}$_min is called a "minimum value $-a_{M1}$_min_et1" or the like. Note that if the explanation of FIG. 4 is used to the determination of the driving policy in the third embodiment, the phase to which the coordinate (d, v|η|$-a_{M1}$_min_et) belongs is read as the "minimum value phase".

3.2.2 Reflection of Driving Policy

The reflection of the driving policy is performed according to the driving policy determined for each estimated time ET. The reflection of the third embodiment is the same as that of the first embodiment except that the reflection is performed for each estimated time ET.

3.2.3 Effect

According to the characteristics of the third embodiment, it is possible to obtain effects equivalent to those in the first embodiment. In other words, even when it is uncertain whether or not the moving body MO will cross the trajectory TP in the near future, it is possible to execute the automated driving control in which the driving safety and the driving efficiency are compatible with each other.

3.3 Vehicle Control System

Next, a configuration example of the system in which the automated driving control including the characteristic processing is executed will be described.

3.3.1 System Configuration Example

Figure 19:
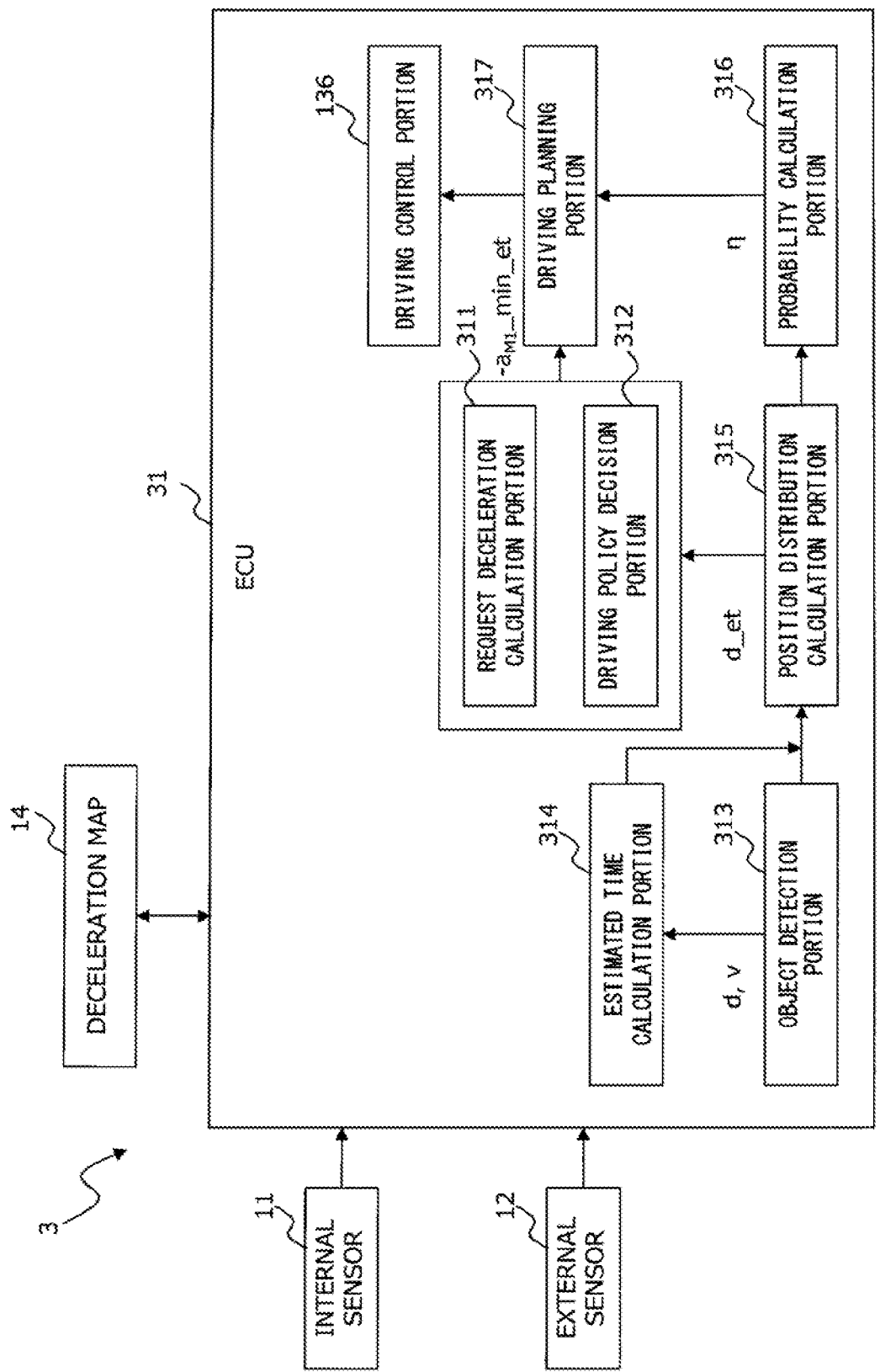
FIG. 19 is a block diagram for showing a configuration example of a vehicle control system according to the third embodiment.

FIG. 19 is a block diagram for showing a configuration example of a vehicle control system according to the third embodiment. As shown in FIG. 19, a vehicle control system 3 includes an ECU 31. The internal sensor 11, the external sensor 12 and the deceleration map 14 are common to the configuration example of the system 1 shown in FIG. 8.

The hardware configuration of the ECU 31 is the same as that of the ECU 13 described in FIG. 8. The functional configuration of the ECU 31 will be described in detail in section "3.3.2".

3.3.2 Configuration Example of ECU

As shown in FIG. 19, the ECU 31 includes a request deceleration calculation portion 311, a driving policy decision portion 312, an object detection portion 313, an estimated time calculation portion 314, a position distribution calculation portion 315, a probability calculation portion 316, and a driving planning portion 317. The driving control portion 136 is common to the ECU 13 shown in FIG. 8. These function blocks are realized when the processor of the ECU 31 executes various control programs stored in the memory. Hereinafter, for convenience of explanation the request deceleration calculation portion 311, the driving policy decision portion 312 and the like are abbreviated as the "calculation portion 311", the "decision portion 312" and the like.

The calculation portion 311 calculates the request value of the deceleration $-a_{M1}$ for each estimated time ET. The request value is calculated by referring to the deceleration map 14. The reference of the deceleration map 14 is performed by using the information on the distance d_et and relative speed v (i.e., $-v_{M1}$) which are calculated when the moving body MO crosses the driving trajectory TP. The calculation of the request value executed by the calculation portion 311 is essentially the same as that executed by the calculation portion 131 described in FIG. 8. The calculation portion 311 transmits the request value to the decision portion 312.

The decision portion 312 determines the driving policy for each estimated time ET. The decision portion 312 first specifies the minimum value $-a_{M1}\_min\_et$ based on the request value transmitted from the calculation portion 311. If there is only one request value is included in the estimated time ETi, this request value is the minimum value $-a_{M1}\_min\_et$ corresponding to an estimated time ETi. If more than one request value is included, the request value with the lowest deceleration $-a_{M1}$ is the minimum value $-a_{M1}\_min\_et$ corresponding to the estimated time ETi.

The decision portion 312 subsequently specifies the cell with the minimum value $-a_{M1}\_min\_et$ (referred to as a "minimum value cell" in the third embodiment below) for each estimated time ET. The decision portion 312 then determines any of (i) to (iv) below as the driving policy based on the segmented area to which the minimum value cell belongs. The driving policy is determined for each estimated time ET. The decision portion 312 transmits the determined driving policy to the planning portion 317.

(i) Perform the slowdown of the vehicle M1 immediately with the minimum value $-a_{M1}\_min\_et$ (ii) Maintain current acceleration or deceleration (iii) Postpone the start of the slowdown until the probability η of the minimum value cell is equal to or greater than the threshold η_th7

(iv) Perform the slowdown by changing the minimum value $-a_{M1}\_min\_et$ in accordance with the probability η of the minimum value cell Note that the threshold η_th 7 corresponds to the probability η when a certain accuracy is recognized in the presence of the moving body MO. The threshold η_th7 satisfies η_th0<η_th7<η_th1.

Figure 20:
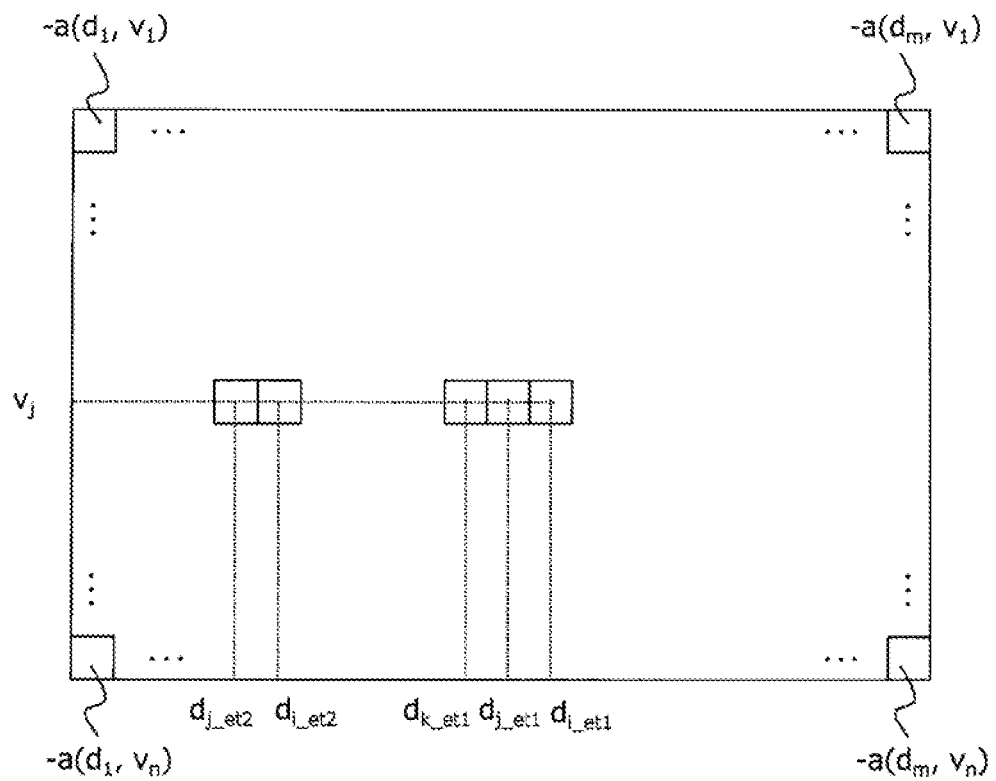
FIG. 20 is a diagram for illustrating an example to specify a segmented area to which a minimum value cell belongs.

FIG. 20 is a diagram for illustrating an example to specify the segmented area to which the minimum value cell belongs. FIG. 20 shows cases where the estimated time ET is et1 and et2. If the estimated time ET is et1, the deceleration $-a$ $(d_{i\_et1}, v_j)$, $-a$ $(d_{j\_et1}, v_j)$, and $-a$ $(d_{k\_et1}, v_j)$ are the request value. Therefore, in this case, the most rapid deceleration one of these request values is the minimum value $-a_{M1}\_min\_et1$. And by comparing the minimum value $-a_{M1}\_min\_et1$ and the boundary deceleration, the minimum value $-a_{M1}\_min$ is allocated to one of the four segmented areas described above.

Here, the fact that the three request value exist indicates that the probability η of the minimum value $-a_{M1}\_min\_et1$ is between the thresholds η_th0 and η_th1. By considering this suggestion, it is possible to specify which of the phase I to V the segmented area to which the cell having the minimum value $-a_{M1}\_min\_et1$ belongs.

If the estimated time ET is et2, the minimum value $-a_{M1}\_min\_et2$ is specified in the same way as the case where the estimated time ET is et1. Then, the segmented area to which the cell having this minimum value belongs is specified by a comparison of the minimum value $-a_{M1}\_min\_et2$ with the boundary deceleration and an estimation with the total number of the request value (in this case, two).

The detection portion 331 detects the object based on the information detected by the external sensor 12. The detection portion 313 extracts the information on the state of the moving body MO from the information on the detected object. The extracted information includes at least the information on the position of the moving body MO. When the extracted information includes the position information, the position distribution of the moving body MO can be calculated. The extracted information may include the information on the moving speed $v_{MO}$ and the orientation of the moving body MO. If these pieces of information are included in the extracted information, the accuracy of the calculation of the position distribution is improved. The detection portion 331 also transmits the extracted information to the calculation portions 314 and 315.

The calculation portion 314 calculates the estimated time ET. The estimated time ET is calculated, for example, based on the distance from the position of the moving body MO to the reference position of the vehicle M1 and the driving speed $v_{M1}$. The calculation portion 314 transmits the estimated time ET to the calculation portion 315.

The calculation portion 315 calculates the position distribution. The position distribution is calculated by applying the position of the moving body MO to the speed distribution model. The calculation portion 315 transmits the calculated position distribution (i.e., the distributions representing an error in the position of the moving body MO) to the calculation portion 316. The calculation portion 315 also calculates the distance d_et based on the calculated position distribution, the estimated time ET, and the driving trajectory TP. The calculation portion 315 transmits the calculated distance d_et to the calculation portion 311 and the decision portion 312.

The calculation portion 316 calculates the probability η that the moving body MO exists at the position separated from the vehicle M1 on the driving trajectory TP by the distance d_et based on the position distribution from the calculation portion 315. The calculation portion 316 transmits the calculated probability η to the planning portion 317.

The planning portion 317 plans the driving plan of the automated driving. The basic function of planning portion 317 is the same as that of the planning portion 135 described in FIG. 8. That is, when receiving the driving policy from the decision portion 312, the planning portion 317 changes the information on the driving state in the target position while referring to the probability η from the calculation portion 316 appropriately, the planning portion 317 transmits to the control portion 136 the information on the driving trajectory TP including the information on the driving state.

3.4 Processing Example Executed by ECU

Figure 21:
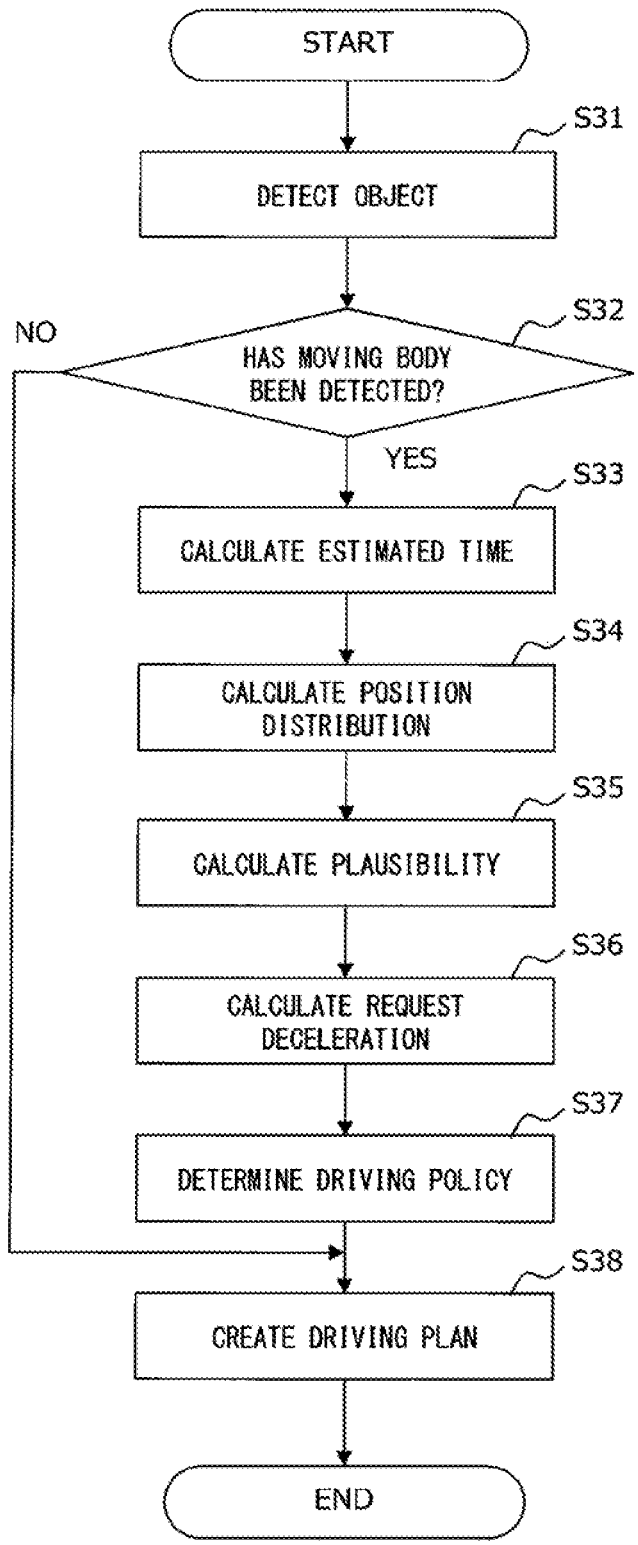
FIG. 21 is a flowchart for illustrating a flow of processing which is executed by the ECU for automated driving control in the third embodiment.

FIG. 21 is a flowchart for illustrating a processing flow executed by the ECU 31 to execute the automated driving control. In the routine shown in FIG. 21, the ECU 31 first detects the object (step S31). The processing of the step S31 is the same as that of the step S11 shown in FIG. 11.

Subsequent to the processing of the step S31, the ECU 31 determines whether or not the moving body MO has been detected (step S32). Specifically, the ECU 31 determines whether or not the information on the position of the moving body MO is included in the information on the object detected in the processing of the step S31. If the judgement result of the step S32 is negative, the ECU 31 proceeds to the step S38.

If the judgement result of the step S32 is positive, the ECU 31 calculates the estimated time ET (step S33). Specifically, the ECU 31 calculates the estimated time ET based on the distance from the position of the moving body MO to the reference position of the vehicle M1 and the driving speed $v_{M1}$.

Subsequent to the processing of the step S33, the ECU 31 calculates the position distribution (step S34). The ECU 31 specifically applies the position of the moving body MO to the speed distribution model to calculate the position distribution. The ECU 31 also calculates the distance d_et based on the calculated position distribution, the estimated time ET calculated in the step S33, and the driving trajectory TP.

Subsequent to the processing of the step S34, the ECU 31 calculates the probability η (step S35). Specifically, the ECU 31 calculates the probability η that the moving body MO exists at the position separated from the vehicle M1 on the driving trajectory TP by the distance d_et based on the position distribution which was calculated in the step S34.

Subsequent to the processing of the step S35, the ECU 31 calculates the request deceleration (step S36). Specifically, ECU 31 calculates the request deceleration by referring to deceleration map 14 using the distance d_et and the relative speed v which were calculated in the step S34.

Subsequent to the processing of the step S36, the ECU 31 determines the driving policy (step S37). The processing of the step S37 is the same as that of the step S15 shown in FIG. 11.

In the step S38, the ECU 31 plans the driving plan. The processing of the step S38 is the same as that of the step S16 shown in FIG. 11.

4. Fourth Embodiment

Next, a fourth embodiment will be described with reference to FIGS. 22 to 24. Note that descriptions overlapping with those of the first or third embodiment is omitted as appropriate.

4.1 Assumption

Figure 22:
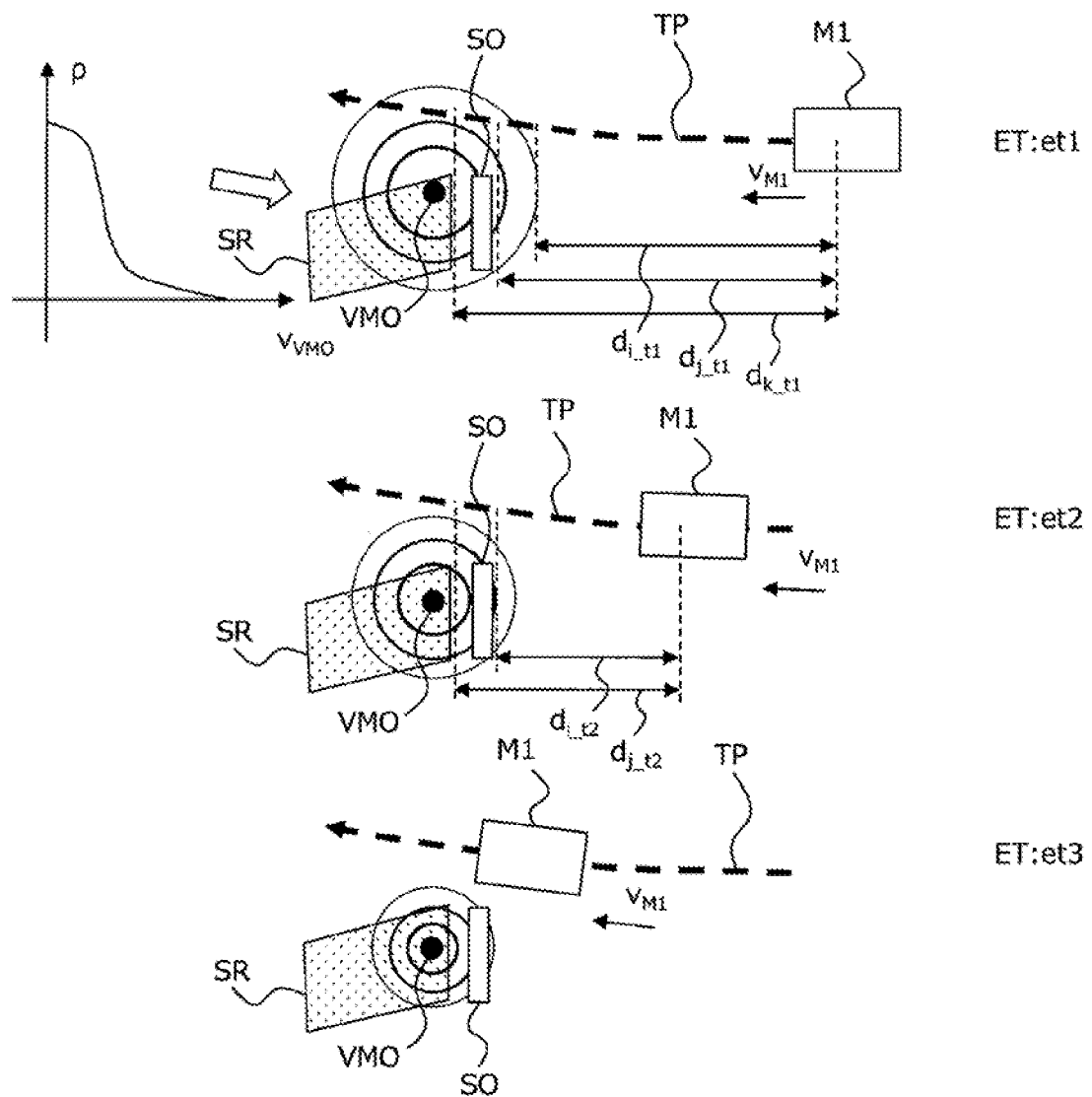
FIG. 22 is a diagram for illustrating a situation where a fourth embodiment is assumed.

FIG. 22 is a diagram for illustrating a situation where the fifth embodiment. On the vehicle M1 shown in FIG. 22, a vehicle control system according to the fourth embodiment (hereinafter also referred to as a "system" in the fourth embodiment) is mounted.

As shown in FIG. 22, an occluding body SO exists in front of the vehicle M1 and to the side of the driving trajectory TP. The occluding body SO is a nearest occluding body of the vehicle M1. Examples of the occluding body SO include a guardrail and a building. Note that there is no moving or static obstacle between the occluding body SO and the vehicle M1. The situation where the moving or static obstacle exists corresponds to the situation described in FIG. 1. Further, there is no traffic signal TS between the occluding body SO and the vehicle M1. The situation where the traffic signal TS exists corresponds to the situation described in FIG. 12. There is no moving body MO between the occluding body SO and the vehicle M1. The situation where the moving body MO exists corresponds to the situation described in FIG. 18.

On a back side of the occluding body SO, a barrier area SR is formed in which laser beam is unable to reach. Assume that a potential moving target VMO exists in the barrier area SR. The potential moving target VMO is the moving body that is virtually set in the barrier area SR by the system. Examples of the potential moving target VMO include a walker and a bicycle. Like the moving body MO, the potential moving target VMO moves in accordance with the speed distribution model.

4.2 Characteristic of Fourth Embodiment

In the third embodiment, since there is the possibility that the moving body MO may become the slowdown target OBJ, the deceleration feature shown in FIG. 2 was applied to the moving body MO. In the fourth embodiment, this moving body MO is replaced by the potential moving target VMO and the deceleration feature shown in FIG. 2 is applied to the potential moving target VMO. In the following explanation of fourth embodiment, among the coordinates (d, v) corresponding to the state of the potential moving target VMO until estimated time ET has elapsed, the coordinate (d, v) in which the probability that the potential moving target VMO exists at the position d_et away from the vehicle M1 on the driving trajectory TP is η is referred to as a "coordinate (d, v|η)".

4.2.1 Determination of Driving Policy

The driving policy is determined for each estimated time ET. That is, the determination of the driving policy is the same as that in third embodiment.

4.22 Reflection of Driving Policy

The reflection of the driving policy is performed according to the driving policy determined for each estimated time ET. That is, the determination of the driving policy is the same as that in third embodiment.

4.2.3 Effect

According to the characteristics of the fourth embodiment, it is possible to obtain effects equivalent to those in the third embodiment. In other words, even when it is uncertain whether or not the potential moving target VMO will cross the driving trajectory TP in the near future, it is possible to execute the automated driving control in which the driving safety and the driving efficiency are compatible with each other.

4.3 Vehicle Control System

4.3.1 System Configuration Example

Figure 23:
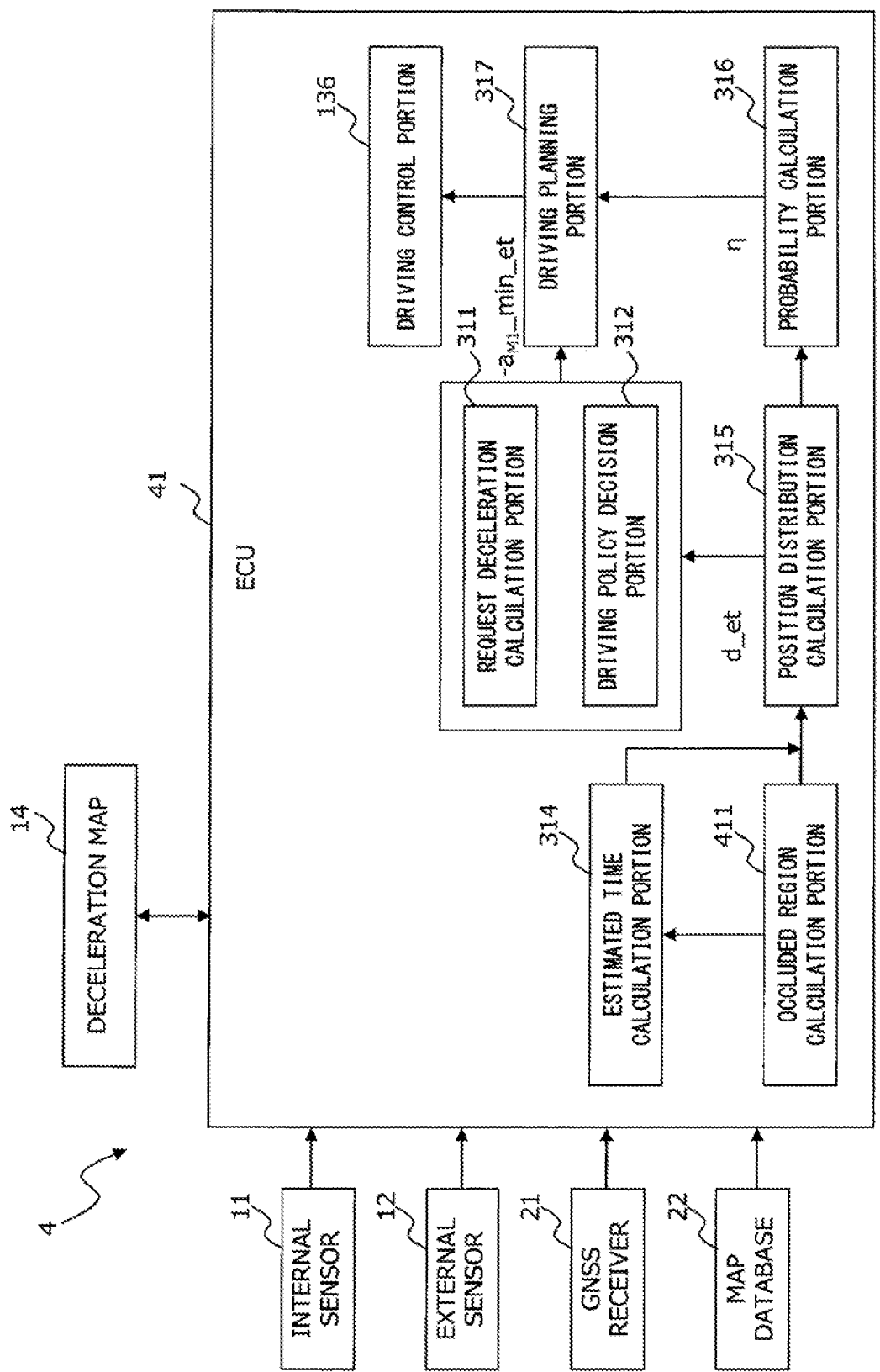
FIG. 23 is a block diagram for showing a configuration example of a vehicle control system according to the fourth embodiment.

FIG. 23 is a block diagram for illustrating a configuration example of a vehicle control system according to the fourth embodiment. As shown in FIG. 23, a vehicle control system 4 includes an ECU 41. The internal sensor 11, the external sensor 12 and the deceleration map 14 are common to the configuration example of the system 1 shown in FIG. 8. The GNSS receiver 21 and the map database 22 are common to the configuration example of the system 2 shown in FIG. 16.

The hardware configuration of the ECU 41 is the same as that of the ECU 13 described in FIG. 8. The functional configuration of the ECU 41 will be described in detail in section "4.3.2".

4.3.2 Configuration Example of ECU

As shown in FIG. 23, the ECU 41 includes comprises an occluded region calculation portion 411. The request deceleration calculation portion 311, the driving policy decision portion 312, the estimated time calculation portion 314, the position distribution calculation portion 315, the probability calculation portion 316, the driving planning portion 317 and the driving control portion 136 are common functions as the ECU 31 shown in FIG. 19. These function blocks are realized when the processor of the ECU 41 executes various control programs stored in the memory. Hereinafter, for convenience of explanation, the occluded region 411 is abbreviated as the "calculation portion 411".

The calculation portion 411 calculates a barrier area SR. The barrier area SR is detected based on the information detected by the external sensor 12 (more specifically, data point information from the LIDAR). The calculation portion 411 calculates the distance from the vehicle M1 to the barrier area SR. This distance is calculated based on the data point information. The distance of the barrier area SR may be calculated based on the positional information of the vehicle M1 and the map information. If the barrier area SR is detected, the calculation portion 411 sets the potential moving target VMO in the barrier area SR. The information on the position of the set potential moving target VMO is transmitted to the calculation portion 314 and 315.

4.4 Processing Example Executed by ECU

Figure 24:
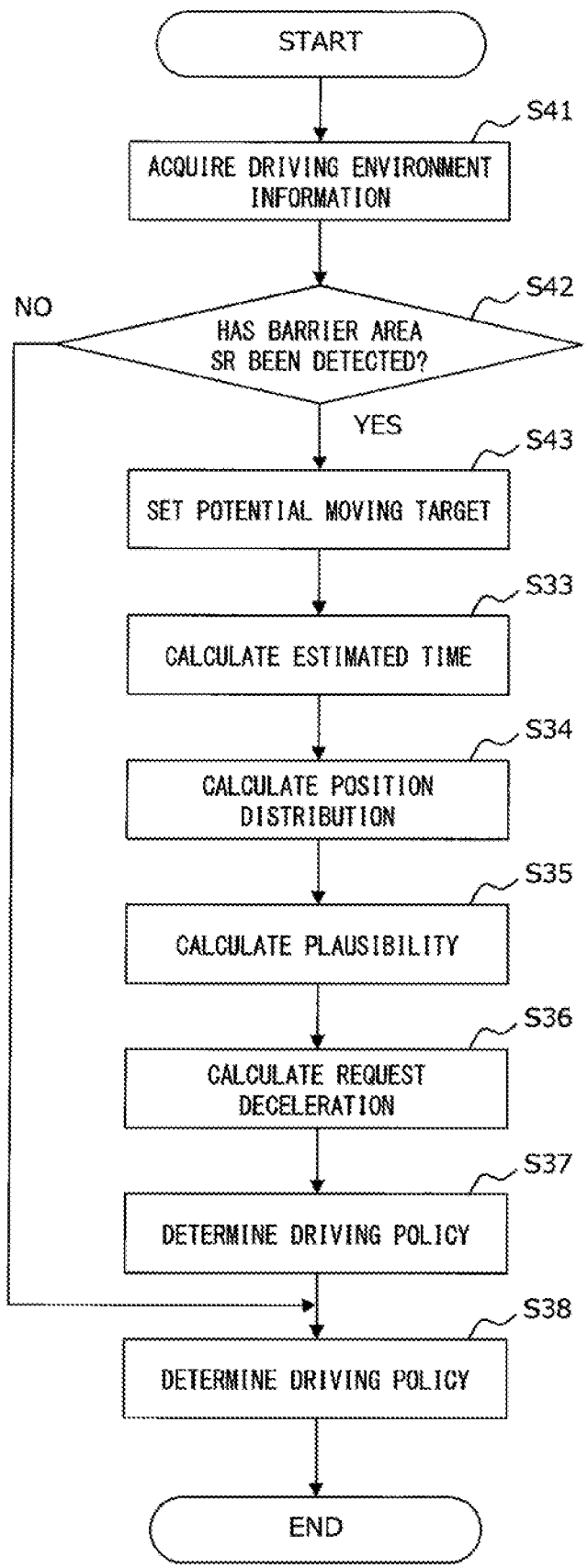
FIG. 24 is a flowchart for illustrating a flow of processing which is executed by the ECU for automated driving control in the fourth embodiment.

FIG. 24 is a flowchart for illustrating a processing flow executed by the ECU 41 to execute the automated driving control. In the routine shown in FIG. 24, the ECU 41 first acquires the driving environment information (step S41). The processing of the step S41 is the same as that of the step S21 shown in FIG. 17.

Subsequent to the processing of the step S41, the ECU 41 determines whether or not the barrier area SR has been detected (step S42). Specifically, the ECU 41 determines whether or not the barrier area SR exists based on the driving environment information acquired in the step S41. If the judgement result of the step S42 is negative, the ECU 41 proceeds to the step S38.

If the judgement result of the step S42 is positive, the ECU 41 sets the potential moving target VMO in the barrier area SR (step S43). Specifically, ECU 41 sets the potential moving target VMO at the position where the distance from the driving trajectory TP is the shortest. The processing executed after the step S43 is as described in FIG. 21.

5. Fifth Embodiment

Next, a fifth embodiment will be described with reference to FIGS. 25 to 27. Note that descriptions overlapping with those of the first or third embodiment is omitted as appropriate.

5.1 Assumption

The fifth embodiment assumes the same situation as that in the third or fourth embodiment. Hereinafter, a case will be described where the situation assumed by the fifth embodiment is the same as that of the third embodiment.

5.2 Characteristic of Fifth Embodiment

5.2.1 Setting of a Plurality of Driving Trajectory Candidates (Hereinafter Referred to as a "Candidate Trajectory")

Figure 25:
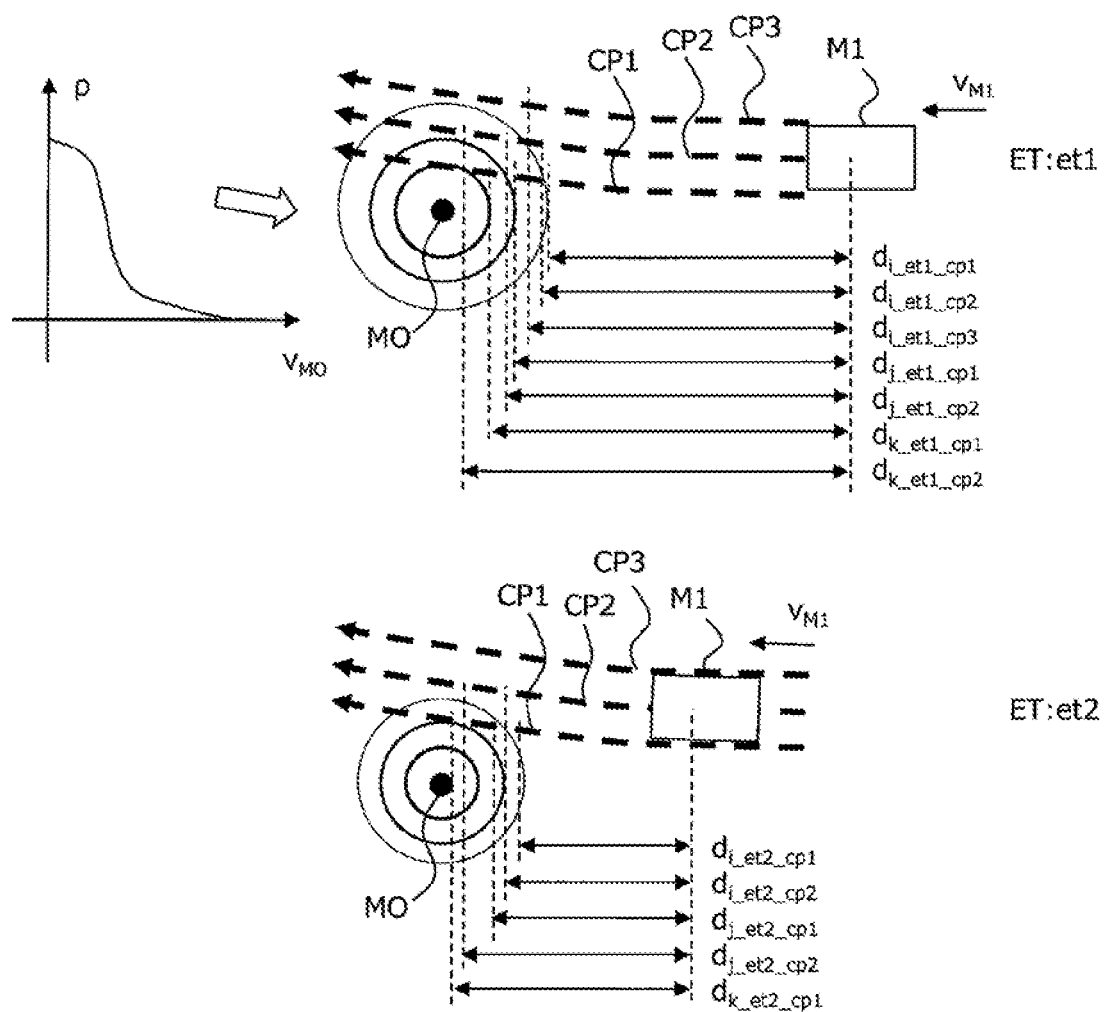
FIG. 25 is a diagram for explaining features of a fifth embodiment.
Figure 26:
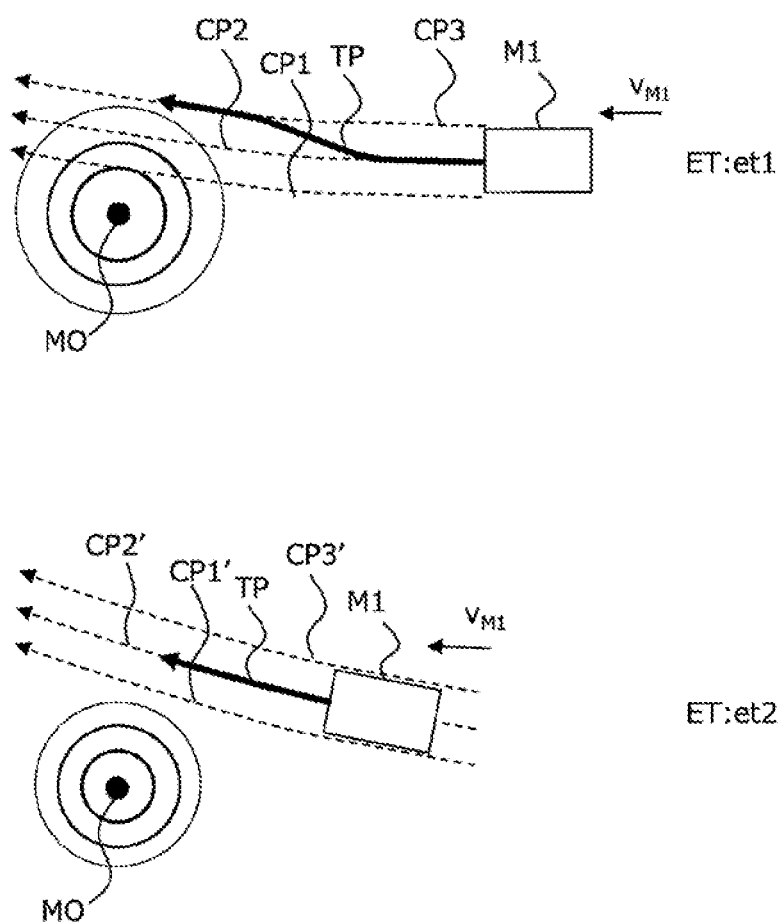
FIG. 26 is a diagram for explaining an example to set of a driving trajectory.

FIG. 25 is a diagram for explaining characteristics of the fifth embodiment. In the first to fourth embodiment, only one driving trajectory TP was set by the vehicle control system. On the other hand, the vehicle control system according to the fifth embodiment (hereinafter also referred to as a "system") sets two or more candidate trajectory CPs.

In the examples shown in FIG. 25, a total of three candidate trajectory CP1, CP2 and CP3 are set by the system. The candidate trajectory CP2 is selected as the driving trajectory TP by the system. Therefore, the vehicle M1 on which the system is mounted is scheduled to run on the candidate trajectory CP2 by executing the automated driving control. However, in FIG. 25, a moving body MO exists in front of the vehicle M1 and on the side of the candidate trajectory CPL. Thus, the distance d_et which was described in FIG. 18 is applied to each of the candidate trajectory CP1 to 3.

Consider whether the intersection described in FIG. 18 is obtained in each of the candidate trajectory CP1 to 3. Then, in the example shown in FIG. 25, distances di_et1_cp1, di_et1_cp2, di_et1_cp3, dj_et1_cp1, dj_et1_cp2, dk_et1_cp1 and dk_et1_cp2 are represented as the distance d_et when the estimated time ET is et1. Also, distances di_et2_cp1, di_et2_cp2, dj_et2_cp1, dj_et2_cp2 and dk_et2_cp1 are represented as the distance d_et when the estimated time ET is et2. In the following explanation of the fifth embodiment, the distance d_et, which is calculated in conjunction with the candidate trajectory CP, is collectively referred to as a "distance d_et_cp".

These distance d_et_cp are related to an existence probability of the moving body MO calculated in accordance with the speed distribution model. For this reason, in the fifth embodiment, a is defined as the probability that the moving body MO exists at the position separated from the vehicle M1 on each candidate trajectory CP by the distance d_et_cp before the estimated time ET has elapsed. In the following explanation of the fifth embodiment, among the coordinates (d, v) that correspond to the state of the moving body MO until the estimated time ET has elapsed, the coordinate (d, v) in which the probability that the moving body MO exists at the position d_et_cp away from the vehicle M1 on the candidate trajectory TP is η is referred to as a "coordinate (d, v|cp|η)".

5.2.2 Determination of Driving Policy

In the third embodiment, the driving policy was determined for each estimated time ET. On the other hand, in the fifth embodiment, the driving policy is determined for each estimated time ET combined with each candidate trajectory CP. Note that the generic term "minimum value $-ax\text{-}min\_et$" refers to the minimum value $-a_{M1}\_min$ specified for each estimated time ET is the same as the third embodiment. In addition, if the explanation of FIG. 4 is used to the determination of the driving policy in the fifth embodiment, the phase to which the coordinate (d, v|cp|η|-$a_{M1}\_min\_et$) belongs is read as the "minimum value phase".

5.2.3 Reflection of Driving Policy

If the driving policy is determined for each estimated time ET combined with each candidate trajectory CP, two or more coordinates with the same estimated time ET (d, v|cp|η|-$a_{M1}\_min\_et$) may be specified. For example, in the upper stage of FIG. 25, the minimum value $-a_{M1}\_min\_et1$ is specified in each of the candidate trajectory CP1 to 3. Then there are three "minimum value phases" for the same estimated time ET (i.e., et1). In the lower stage of FIG. 25, the minimum value $-a_{M1}\_min\_et2$ is specified for each of the candidate trajectory CP1 and 2. This means that there are two "minimum value phases" for the same estimated time ET (i.e., et2).

Therefore, the fifth embodiment selects an optimal value of the minimum value $-a_{M1}\_min\_et$ when two or more coordinates (d, v|cp|η|-$a_{M1}\_min\_et$) having the same estimated time ET are specified. The selection of the optimal value is performed by searching for the minimum value $-a_{M1}\_min\_et$ which minimizes a difference from the current target acceleration $a_{M1}\_tgt$ (hereinafter referred to as an "acceleration difference").

5.2.4 Setting of Driving Trajectory for Estimated Time

If the optimal value is selected, the candidate corresponding to the optimal value trajectory CP (hereinafter referred to as a "candidate trajectory $CP_{OV}$") is set as the driving trajectory TP for the estimated time ET. FIG. 26 is a diagram for explaining an example to set the driving trajectory TP. In the examples shown in the upper stage of FIG. 26, the candidate trajectory CP1 to 3 are specified for the same estimated time ET (i.e., et1). In this situation, the candidate trajectory CP3 is selected as the candidate trajectory $CP_{OV}$ since the candidate trajectory CP3 has the strongest possibility of minimizing the acceleration difference among the candidate trajectory CP1 to 3. Then the candidate trajectory CP3 is set to the driving trajectory TP.

A setting example immediately after the example shown in the upper stage is shown in the lower stage. When the estimated time ET becomes et2, the candidate trajectory $CP_{OV}$ is selected based on the newly set the candidate trajectory CP1' to 3'. In this situation, the candidate trajectory CP2' is selected as the candidate trajectory $CP_{OV}$ since the candidate trajectory CP2' has the strongest possibility of minimizing the acceleration difference among the candidate trajectory CP1' to 3'. Then the candidate trajectory CP2' is set to the driving trajectory TP.

5.2.5 Effect

According to the characteristics of the fifth embodiment, the driving policy is determined for each estimated time ET combined with each candidate trajectory CP. And when two or more coordinates with the same estimated time ET (d, v|cp|η|–$a_{M1}\_min\_et$) are specified, the optimal value is set. The setting of the optimal value is performed by searching for the minimum value $-a_{M1}\_min\_et$ which minimizes the acceleration difference. Therefore, even when it is uncertain whether or not the moving body MO will cross the trajectory TP in the near future, it is possible to execute the automated driving control in which the driving safety and the driving efficiency are compatible with each other.

5.3 Vehicle Control System

5.3.1 System Configuration Example

Figure 27:
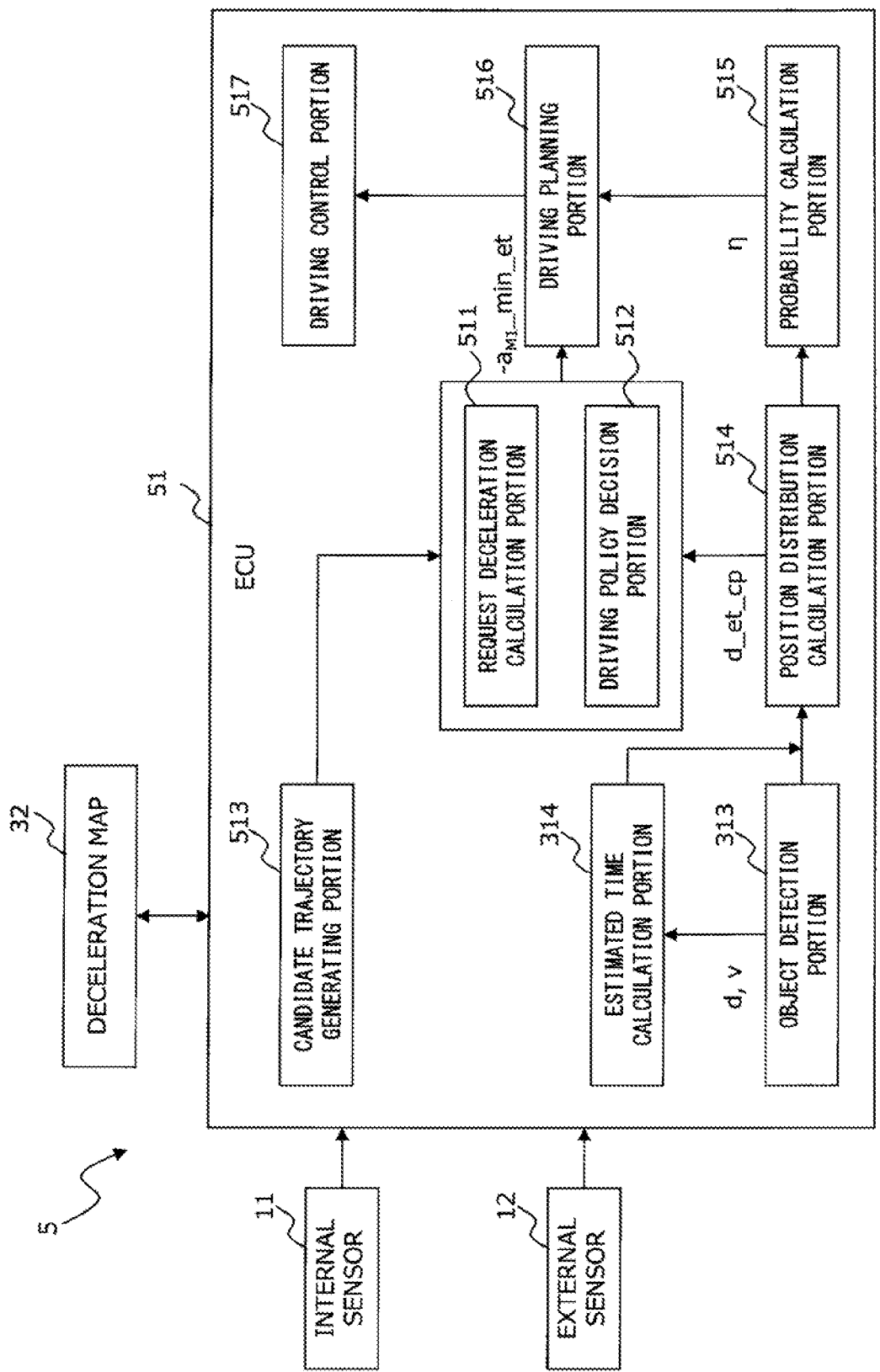
FIG. 27 is a block diagram for showing a configuration example of a vehicle control system according to the fifth embodiment.

FIG. 27 is a block diagram for showing a configuration example of a vehicle control system according to the fifth embodiment. As shown in FIG. 27, a vehicle control system 5 includes an ECU 51. The internal sensor 11, the external sensor 12 and the deceleration map 14 are common to the configuration example of the system 1 shown in FIG. 8.

The hardware configuration of the ECU 51 is the same as that of the ECU 13 described in FIG. 8. The functional configuration of the ECU 51 will be described in detail in section "5.3.2".

5.3.2 Configuration Example of ECU

As shown in FIG. 27, the ECU 51 includes a request deceleration calculation portion 511, a driving policy decision portion 512, a candidate trajectory generating portion 513, a position distribution calculation portion 514, a probability calculation portion 515, a driving planning portion 516, and a driving control portion 517. The object detection portion 313 and the estimated time calculation portion 314 are common to the ECU 31 shown in FIG. 19. These function block are realized when the processor of the ECU 51 executes various control programs stored in the memory. Hereinafter, for convenience of explanation, the request deceleration calculation portion 511, the driving policy decision portion 512 and the like are abbreviated as the "calculation portion 511", the "decision portion 512" and the like.

The calculation portion 511 calculates the request value of the deceleration $-a_{M1}$ for each combination of estimated time ET and candidate trajectory CP. The request value is calculated by referring to the deceleration map 14. The reference of the deceleration map 14 is performed by using the information on the distance $d\_et\_cp$ and the relative speed v (i.e., $-v_{M1}$). The calculation of the request value executed by the calculation portion 511 is essentially the same as that executed by the calculation portion 131 described in FIG. 8. The calculation portion 511 transmits the request value to the decision portion 512.

The decision portion 512 determines the driving policy for each estimated time ET. The decision portion 512 first specifies the minimum value $-a_{M1}\_min\_et\_cp$ based on the request value transmitted from the calculation portion 511. If there is only one request value for more than one candidate trajectory CP with the same estimated time ETj, this request value is the minimum value $-a_{M1}\_min\_et$ corresponding to the estimated time ETj. If more than one request value exists, the minimum value $-a_{M1}\_min\_et$ corresponding to the estimated time ETj is specified in conjunction with the candidate trajectory CP.

The decision portion 512 subsequently specifies the cell with the minimum value $-a_{M1}\_min\_et$ (referred to as a "minimum value cell" in fifth embodiment below) for each estimated time ET. The decision portion 512 then determines any of (i) to (iv) below as the driving policy based on the segmented area to which the minimum value cell belongs.

(i) Perform the slowdown of the vehicle M1 immediately with the minimum value $-a_{M1}\_min\_et$ (ii) Maintain current acceleration or deceleration (iii) Postpone the start of the slowdown until the probability η of the minimum value cell is equal to or greater than the threshold η_th7

(iv) Perform the slowdown by changing the minimum value $-a_{M1}\_min\_et$ in accordance with the probability η of the minimum value cell The driving policies of (i) to (iv) above are the same as those described in the third embodiment.

The generating portion 513 generates a plurality of the candidate trajectory CPs. Each candidate trajectory CP is set as a curved line parallel to the current driving trajectory TP. The information on the present driving trajectory TP may be acquired from the planning portion 516 or acquired other than the planning portion 516. The generating portion 513 transmits each of the generated candidate trajectory CPs to the calculation portion 51 and the decision portion 512.

The calculation portion 514 calculates the position distribution. The position distribution is calculated by applying the position of the moving body MO to the speed distribution model. The calculation portion 514 transmits the calculated position distribution to the calculation portion 515. The calculation portion 514 also calculates the distance $d\_et\_cp$ based on the calculated position distribution, the estimated time ET, and the candidate trajectory CP. The calculation portion 514 transmits the calculated distance d_et_cp to the calculation portion 511 and the decision portion 512.

Based on the position distribution from the calculation portion 514, the calculation portion 515 calculates the probability η that moving body MO exists at the position separated from the vehicle M1 on the candidate trajectory CP by the distance d_et_cp. The calculation portion 515 transmits the calculated probability η to the planning portion 516.

The planning portion 516 plans the driving plan of the automated driving. The basic function of the planning portion 516 is the same as that of the planning portion 135 described in FIG. 8. That is, when receiving the driving policy from the decision portion 512, the planning portion 516 changes the information on the driving state in the target position while referring to the probability η from the calculation portion 515 appropriately. However, if the minimum value $-a_{M1}\_min\_et$ corresponding to the estimated time ETj is specified for more than one candidate trajectory CP, the planning portion 516 selects the optimal value. If the optimal value is selected, the planning portion 16 sets the candidate corresponding to the optimal value trajectory CP as the driving trajectory TP for the estimated time ET. The planning portion 516 transmits to the control portion 517 the information on the driving trajectory TP including the information on the driving state.

The control portion 517 determines control amount of the various driving device based on the information on the driving state such that the vehicle M1 runs on the driving trajectory TP. When receiving a new information on the driving trajectory TP from the planning portion 516, the control portion 517 determines control amount of the driving device such that the vehicle M1 runs on this new driving trajectory TP.

What is claimed is:

1. A vehicle control system in which automated driving control of a vehicle is executed, the vehicle control system comprising:
   an acquiring device which is configured to acquire driving environment information of the vehicle; and
   a controller which is configured to execute the automated driving control based on the driving environment information,
   wherein, in the automated driving control, the controller is configured to execute deceleration setting processing in which a target deceleration is set based on a deceleration feature,
      wherein a relationship between deceleration and a state of a slowdown target of the vehicle is defined in the deceleration feature,
      wherein:
         relative speed of the slowdown target and a distance from the slowdown target to the vehicle are included in the state; and
            the state is divided into multiple phases by a predetermined boundary deceleration in the deceleration feature,
      wherein, in the deceleration setting processing, the controller is configured to:
      specify, based on the driving environment information and the deceleration feature, at least one deceleration corresponding to the state;
      calculate for each of the at least one deceleration a plausibility indicating an accuracy of information on the state or the accuracy of information associated with the state;
      specify a minimum value of the at least one deceleration; and
      reflect the minimum value to the target deceleration with a reflection degree of 0 to 100% based on a minimum value phase indicating a phase to which the minimum value belongs in the deceleration feature and a minimum value plausibility indicating the plausibility corresponding to the minimum value.

2. The vehicle control system according to claim 1, wherein:
   the boundary deceleration includes a first deceleration which corresponds to a maximum deceleration of the vehicle; and
   in the deceleration setting processing, the controller is configured to set the reflection degree to 100% regardless of the minimum value plausibility when the minimum value phase belongs to a phase located closer to a rapid deceleration side than the first deceleration.

3. The vehicle control system according to claim 1, wherein:
   the boundary deceleration includes a second deceleration which corresponds to a minimum deceleration of the vehicle; and
   in the deceleration setting processing, the controller is configured to set the reflection degree to 0% regardless of the minimum value plausibility when minimum value phase belongs to a phase located closer to a slow deceleration side than the second deceleration.

4. The vehicle control system according to claim 1, wherein:
   the boundary deceleration includes a first deceleration which corresponds to a maximum deceleration of the vehicle, a second deceleration which corresponds to a minimum deceleration of the vehicle, and a third deceleration which corresponds to a deceleration between the maximum deceleration and the minimum deceleration; and
   in the deceleration setting processing, the controller is configured to change the reflection degree according to specified total number of the at least one deceleration when the minimum value phase belongs to a phase located between the first and third deceleration,
      wherein:
         the reflection degree is set to 100% when the specified total number is one; and
         the reflection degree is set to a value between 0 and 100% depending on the minimum value plausibility when the specified total number is two or more.

5. The vehicle control system according to claim 1, wherein:
   the boundary deceleration includes a first deceleration which corresponds to a maximum deceleration of the vehicle, a second deceleration which corresponds to a minimum deceleration of the vehicle, and a third deceleration which corresponds to a deceleration between the maximum deceleration and the minimum deceleration; and
   in the deceleration setting processing, the controller is configured to change the reflection degree according to a result of comparing the minimum value plausibility with a threshold when the minimum value phase belongs to a phase located between the second and third deceleration,
      wherein:
         the reflection degree is set to 100% when the minimum value plausibility is equal to or greater than the threshold; and the reflection degree is set to 0% when the minimum value plausibility is less than the threshold.

6. The vehicle control system according to claim 1, wherein:
the slowdown target is a nearest moving or static obstacle of the vehicle on a driving trajectory of the vehicle;
the driving environment information includes a distance from the moving or static obstacle to the vehicle and relative speed of the moving or static obstacle; and
the plausibility is the accuracy of the state of the moving or static obstacle.

7. The vehicle control system according to claim 1, wherein:
the slowdown target is a nearest traffic signal of the vehicle on a driving trajectory of the vehicle;
the driving environment information includes a distance from the traffic signal to the vehicle and relative speed of the traffic signal; and
the plausibility is the accuracy associated with the state of the traffic signal where the traffic signal is red or yellow.

8. A vehicle control system in which automated driving control of a vehicle is executed, the vehicle control system comprising:
an acquiring device which is configured to acquire driving environment information of the vehicle; and
a controller which is configured to execute the automated driving control based on the driving environment information,
wherein:
in the automated driving control, the controller is configured to execute deceleration setting processing in which a target deceleration is set based on a deceleration feature;
wherein a relationship between deceleration and a state of a slowdown target of the vehicle is defined in the deceleration feature,
wherein:
relative speed of the slowdown target and a distance from the slowdown target to the vehicle are included in the state; and
the state is divided into multiple phases by a predetermined boundary deceleration in the deceleration feature,
the slowdown target is a nearest moving body of the vehicle which locates laterally of a driving trajectory of the vehicle;
the driving environment information includes driving speed of the vehicle and a position of the moving body; and
the state is a distance from the moving body to the vehicle, assuming that the moving body moves according to a predetermined speed distribution model to enter the driving trajectory,
wherein, in the deceleration setting processing, the controller is configured to:
specify at least one deceleration corresponding to the distance based on the driving speed, the position and deceleration feature;
calculate, for each of the at least one deceleration, probability that the moving body exists at a position on the driving trajectory that is away from the vehicle by the distance until an estimated time that the vehicle travels along the driving trajectory to reach a side of the moving body elapses;
specify a minimum value of the at least one deceleration; and
reflect the minimum value to the target deceleration with a reflection degree of 0 to 100% based on a minimum value phase indicating a phase to which the minimum value belongs in the deceleration feature and a minimum probability indicating the probability corresponding to the minimum value.

9. The vehicle control system according to claim 8, wherein:
the driving trajectory includes at least two candidates; and
in the deceleration setting processing, the controller is configured to:
specify the minimum value for each of the combination of the estimated time and the at least two candidates;
when at least two minimum values having a same estimated time are specified, an optimal value to be reflected to the target deceleration is selected from the at least two minimum values,
wherein the controller is further configured to execute trajectory setting processing in which a target driving trajectory of the vehicle is set when the optimal value is selected,
wherein, in the trajectory setting processing, the controller is configured to set a candidate corresponding to the optimal value to the target driving trajectory of the vehicle in the estimated time.

10. A vehicle control system in which automated driving control of a vehicle is executed, the vehicle control system comprising:
an acquiring device which is configured to acquire driving environment information of the vehicle; and
a controller which is configured to execute the automated driving control based on the driving environment information,
wherein:
in the automated driving control, the controller is configured to execute deceleration setting processing in which a target deceleration is set based on a deceleration feature;
wherein a relationship between deceleration and a state of a slowdown target of the vehicle is defined in the deceleration feature,
wherein:
relative speed of the slowdown target and a distance from the slowdown target to the vehicle are included in the state; and
the state is divided into multiple phases by a predetermined boundary deceleration in the deceleration feature,
the slowdown target is a nearest potential moving target of the vehicle which is set in a barrier area located laterally of a driving trajectory of the vehicle;
the driving environment information includes driving speed of the vehicle and a position of the barrier area; and
the state is a distance from the potential moving body to the vehicle, assuming that the potential moving body moves according to a predetermined speed distribution model to enter the driving trajectory,
wherein, in the deceleration setting processing, the controller is configured to:
specify at least one deceleration corresponding to the distance based on the driving speed, the position and deceleration feature;
calculate, for each of the at least one deceleration, probability that the potential moving body exists at a position on the driving trajectory that is away from the vehicle by the distance until an estimated time that the vehicle travels along the driving trajectory to reach a side of the potential moving body elapses;

specify a minimum value of the at least one deceleration; and reflect the minimum value to the target deceleration with a reflection degree of 0 to 100% based on a minimum value phase indicating a phase to which the minimum value belongs in the deceleration feature and a minimum probability indicating the probability corresponding to the minimum value.

11. The vehicle control system according to claim 10, wherein:

the driving trajectory includes at least two candidates; and in the deceleration setting processing, the controller is configured to:

specify the minimum value for each of the combination of the estimated time and the at least two candidates;

when at least two minimum values having a same estimated time are specified, an optimal value to be reflected to the target deceleration is selected from the at least two minimum values, wherein the controller is further configured to execute trajectory setting processing in which a target driving trajectory of the vehicle is set when the optimal value is selected, wherein, in the trajectory setting processing, the controller is configured to set a candidate corresponding to the optimal value to the target driving trajectory of the vehicle in the estimated time.

\* \* \* \* \*